(12) United States Patent
Liu

(10) Patent No.: US 11,875,825 B1
(45) Date of Patent: Jan. 16, 2024

(54) PERPENDICULAR MAGNETIC RECORDING WRITER WITH DOUBLE DRIVING COIL

(71) Applicant: Headway Technologies, Inc., Milpitas, CA (US)

(72) Inventor: Yue Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 17/871,849

(22) Filed: Jul. 22, 2022

(51) Int. Cl.
*G11B 5/11* (2006.01)

(52) U.S. Cl.
CPC ........................... *G11B 5/11* (2013.01)

(58) Field of Classification Search
None
See application file for complete search history.

(56) References Cited

U.S. PATENT DOCUMENTS

| | | | | |
|---|---|---|---|---|
| 4,538,099 A * | 8/1985 | Moon | ................... | H03F 3/3081 |
| | | | | 330/265 |
| 9,361,912 B1 * | 6/2016 | Liu | ....................... | G11B 5/3163 |
| 10,643,640 B1 * | 5/2020 | Liu | ........................... | G11B 5/23 |
| 10,872,624 B1 * | 12/2020 | Sasaki | ................... | G11B 5/3116 |
| 11,152,021 B1 * | 10/2021 | Liu | ........................ | G11B 5/607 |
| 11,600,293 B1 * | 3/2023 | Lam | ..................... | G11B 5/2654 |
| 2008/0151436 A1 * | 6/2008 | Sato | ..................... | G11B 5/3123 |
| 2015/0043106 A1 * | 2/2015 | Yamada | ............... | G11B 5/1278 |
| | | | | 360/123.05 |
| 2017/0140779 A1 * | 5/2017 | Koui | ...................... | G11B 20/18 |
| 2020/0381012 A1 * | 12/2020 | Chembrolu | ............. | G11B 5/115 |

* cited by examiner

*Primary Examiner* — William J Klimowicz
(74) *Attorney, Agent, or Firm* — DLA Piper LLP (US)

(57) ABSTRACT

A perpendicular magnetic recording (PMR) writer is disclosed. A write current passes through a driving coil and a bucking coil generates a magnetic flux that passes through the main pole tip and is used to write one or more magnetic bits in a magnetic medium. The improved PMR writer includes a double driving coil (DDC) design, in which a second electric current path in parallel with the driving coil through the main pole tip is added to drive the main pole in the same direction as the top driving coil.

20 Claims, 29 Drawing Sheets

PERPENDICULAR MAGNETIC RECORDING WRITER WITH DOUBLE DRIVING COIL

TECHNICAL FIELD

Embodiments of the present disclosure relate generally to a perpendicular magnetic recording (PMR) write head, and in particular PMR write heads that have a double driving coil (DDC) design.

BACKGROUND

Perpendicular magnetic recording has been developed in part to achieve higher recording density than is realized with longitudinal recording devices. A PMR write head typically has a main pole layer with a small surface area (pole tip) at an ABS, and coils that conduct a current and generate a magnetic flux in the main pole such that the magnetic flux exits through the pole tip and enters a magnetic medium (disk) adjacent to the ABS. Magnetic flux is used to write a selected number of bits in the magnetic medium and typically returns to the main pole (MP) through two pathways including a trailing (top) loop and a leading (bottom) loop. The trailing loop is comprised a trailing shield structure with a front side at the ABS, an uppermost trailing (PP3) shield that arches over the driving coil and connects with a top yoke (TY). The TY adjoins a top surface of the MP above a back gap connection (BGC). The trailing loop is also known as the top driving loop and delivers magnetic flux to the MP tip to write positive and negative field into magnetic media. The leading loop has a leading shield with a side at the ABS and in some schemes is connected to a return path (RTP) having a front side recessed from the ABS. The RTP extends back to the BGC and enables magnetic flux in the leading loop pathway to return from the leading shield at the ABS and through the BGC to the MP for faster saturation speed, better adjacent track interference (ATI) and enhanced wide area track erasure (WATE) potential.

Dual write shield (DWS) designs that feature complete leading and trailing loops can provide adjacent track erasure (ATE) improvement by reducing stray field in side shields and in the leading shield and trailing shields. Accordingly, a PMR head can provide a higher write field, a better read back signal, and, in some instances, a greater areal density over LMR heads. With the growing demand for cloud storage and cloud-based network computing, high and ultra-high data rate recording becomes important for high-end disk drive applications.

Therefore, there is a need for a PMR writer with improved writer performance.

SUMMARY

Broadly, embodiments of the present disclosure provide a PMR writer with a double driving coil (DDC) design forms an additional electric path in parallel to the top driving coil through MP tip without changing existing pad layout of PMR heads. In some embodiments according to the present disclosure, the PMR writer can include: (a) a main pole layer (MP) having a MP tip formed between a hot seed (HS) layer in a trailing shield structure, and a leading shield (LS) at an air bearing surface (ABS), and configured so that a write current passing through a driving coil and a bucking coil generates a magnetic flux that passes through the MP tip and is used to write one or more magnetic bits in a magnetic medium; (b) a trailing loop for the magnetic flux return to the MP that comprises the HS layer, a write shield (WS) on the HS layer, an uppermost (PP3) trailing shield (TS), and a top yoke (TY) on a MP back portion; (c) one or both of a first non-magnetic (NM) metal layer formed in a write gap (WG) on a MP trailing side, and a second NM metal layer in a side gap (SG) that adjoins each MP side to establish an electrical connection between the MP tip and one or both of the HS layer and side shields (SS), respectively; and (d) a first insulation layer formed between the TY and PP3 TS to electrically isolate the MP back portion from the trailing loop, wherein the MP is electrically connected to the driving coil and the WS is electrically connected to the driving coil through one or two built-in series resistors (Rct and/or Rcb) to form a second electric current path in parallel with the driving coil through the MP tip.

In some embodiments according to the present disclosure, the PMR writer can further include a leading loop for magnetic flux return to the MP back portion that comprises the LS at the ABS and wherein a second insulation layer is formed on a lower back gap (LBG) or back gap connection (BGC) in the leading loop to electrically isolate the leading loop from the MP back portion.

In some embodiments according to the present disclosure, each of the first insulation layer and the second insulation layer has a thickness of about 10 nm to 300 nm.

In some embodiments according to the present disclosure, each of the first insulation layer and the second insulation layer is a single layer or multilayer comprised of one or more of AlOx, SiOx, TaOx, and TiOx.

In some embodiments according to the present disclosure, each of the first and second NM metal layers is comprised of one or more of Ru, NiCr, Ta, Cu, W, or Ti.

In some embodiments according to the present disclosure, a portion of the second NM metal layer that adjoins each MP side extends from the ABS to a height of 50 nm to 120 nm, and has a cross-track width of 20 nm to 60 nm.

In some embodiments according to the present disclosure, the portion of the first NM metal layer that adjoins the MP tip extends from the ABS to a height of 20 nm to 60 nm, and has a down-track thickness from 15 nm to 22 nm.

In some embodiments according to the present disclosure, the first NM metal layer has a front side that is recessed to a height of 50 nm to 100 nm from the ABS.

In some embodiments according to the present disclosure, the first NM metal layer has a width that is less than a sum (PWA+2s) where PWA is a track width of the MP trailing side and s is a width of each side gap so that the first NM metal layer does not contact a side shield.

In some embodiments according to the present disclosure, the first NM metal layer has a width that is essentially equal to that of the HS layer.

In some embodiments according to the present disclosure, the PMR writer can further include a TY extension that is formed below a front portion of the driving coil, and with a backside that adjoins a front side of the TY.

Also disclosed herein is a head gimbal assembly (HGA). The HGA can include: (a) the PMR writer according to some embodiments of the present disclosure; and (b) a suspension that elastically supports the PMR writer, wherein the suspension has a flexure to which the PMR writer is joined, a load beam with one end connected to the flexure, and a base plate connected to the other end of the load beam.

Also disclosed herein is a magnetic recording apparatus. The magnetic recording apparatus can include: (a) the PMR writer according to some embodiments of the present disclosure; (b) a magnetic recording medium positioned opposite to a slider on which the PMR writer structure is formed; (c) a spindle motor that rotates and drives the magnetic recording medium; and (d) a device that supports the slider, and that positions the slider relative to the magnetic recording medium.

BRIEF DESCRIPTION OF THE DRAWINGS

The accompanying drawings, which are incorporated in and constitute a part of this specification, exemplify various embodiments of the present description and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements and are not generally drawn to scale.

DETAILED DESCRIPTION

Figure 1:
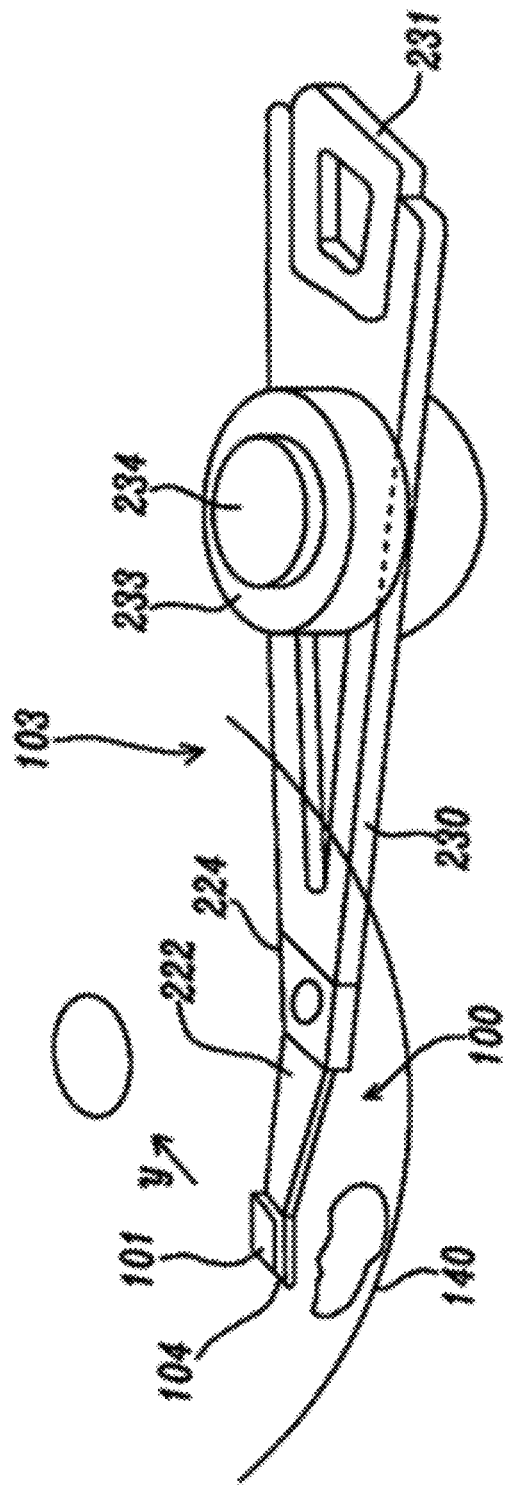
FIG. 1 is a perspective view of a head arm assembly, according to some embodiments of the present disclosure.

The present embodiments relate to a PMR writer with a double driving coil. The PMR writer with a double driving coil (DDC) design can form an additional electric path in parallel to the top driving coil through MP tip without changing existing pad layout of PMR heads. When writing current is applied to writer coil, a branch of the current can flow through the writer shield, MP tip, and MP back gap contact to form a current bias loop in the same routing direction as the top coil.

In the present embodiments, the y-axis can include a cross-track direction, the z-axis can include a down-track direction, and the x-axis can be in a direction orthogonal to the ABS and towards a back end of the device. Dimensions of writer components can be expressed as a width in the y-axis direction, height in the x-axis direction, and a thickness in the z-axis direction. The term "front side" can be defined as the side of a layer that faces the ABS or is at the ABS, while a "backside" can be a side facing away from the ABS. Although the exemplary embodiments relate to a 1+1T coil design, the MP TPP scheme disclosed herein may also be employed with other coil designs, such as 1+1+2T and 2+2T layouts.

The PMR writer with the (DDC) design as described herein can form an electric path through MP tip in parallel to the top driving coil without changing an existing pad layout of PMR heads. The additional current bias loop may not only heat up MP tip region and generate an Oersted field near MP tip region, but also drive the MP and a back gap (BG) to further enhance writer write-ability and high frequency response. The application of DDC designed heads can be transparent to many PMR backend designs and a HDD process with no or minimal modification of various hardware or software components in many PMR writers.

In some instances, a portion of writer current can pass through MP tip region, and a double driving coil can be formed. Writing quality and ADC achievement can be increased due at least to the additional driving force plus a local heating and an Oersted field at the MP tip region, especially for narrow pole width (PWA) heads with a narrow erase width (EW).

In some embodiments, an electric insulation layer of between 10-300 nanometers (nm) can be added between a PP3 layer and a TY layer to isolate the MP electrically from the top loop. For writer structures with a back gap connection (BGC), an additional electric insulation layer between 10-300 nm can be added to isolate the MP electrically from the bottom loop either between a LBG and MP, or between the BGC and MP. The electric insulation layer can be made of single layer or multiple layers of a metallic oxie, such as AlOx, SiOx, TaOx, TiOx, etc. A protect resistor (R_protect) comprising a resistance of around 20K Ohms (or, in some cases, a greater resistance up to fully open) can be built between writer shields (e.g., TH1/SS/LS) and a DFH ground pad (GND), which can prevent coil shunting to a preamp ground (GND).

Multiple types of DDC designs are described herein that can connect the MP and a write shield (WS1) to the top coil following the same top coil routing. For instance, the MP tip can be electrically connected to either a hot seed (HS) layer, a side shield (SS) layer, or both the HS and the SS layers, with an equivalent resistance represented by R_tip. A series resistor Rc with a specifically designed nominal value can control the maximum current flowing through R_tip for a maximum ADC gain without running into any reliability issues. A lead resistor (R_lead) can account for the lead and under path via contact resistance contribution. The DDC design of a PMR head can form a current path through a MP tip parallel to a top coil and drive the MP in the same direction as the top coil. The materials included in the conducting path between the MP tip and the writer shields can include a single layer or multiple layers of non-magnetic metallic materials, such as Ru, NiCr, Ta, Cu, W, Ti, etc.

The conducting path from SS to MP tip can be achieved by metallic SG. A SS tip into an ABS height can be between 50-120 nm. The SG can have a width between 20-60 nm. In some embodiments, a conducting path from HS to MP tip can be achieved by metallic WG exposed at ABS. The metallic WG can include a thickness between 15-22 nm. The conducting path can be a confined path with a width close to or narrower than a PWA or a full metallic WG with a width similar to a HS width. An ABS height of the conducting path to the HS tip height eTHd can be between 20-60 nm.

In some instances, the conducting path from HS to MP tip can be achieved by a recessed metallic connection. An ABS recess height can be between 50-100 nm. The width and height of the recessed conducting path can have more freedom than the exposed designs, with the resistance of R_tip able to be fine-tuned to a preferred value with less device-to-device variation.

As the current bias follows write current with overshoot, the effective gain can follow a maximum tip current (I_tip), while the reliability can follow an RMS of the write current. The DDC design can have more assisting effect in terms of writer write-ability and high frequency response than TPP design at the same reliability limit.

FIG. 1 is a perspective view of a head arm assembly 100, according to some embodiments of the present disclosure. Referring to FIG. 1, a head arm assembly (or Head Gimbal Assembly (HGA)) 100 includes a magnetic recording head 101 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 101 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
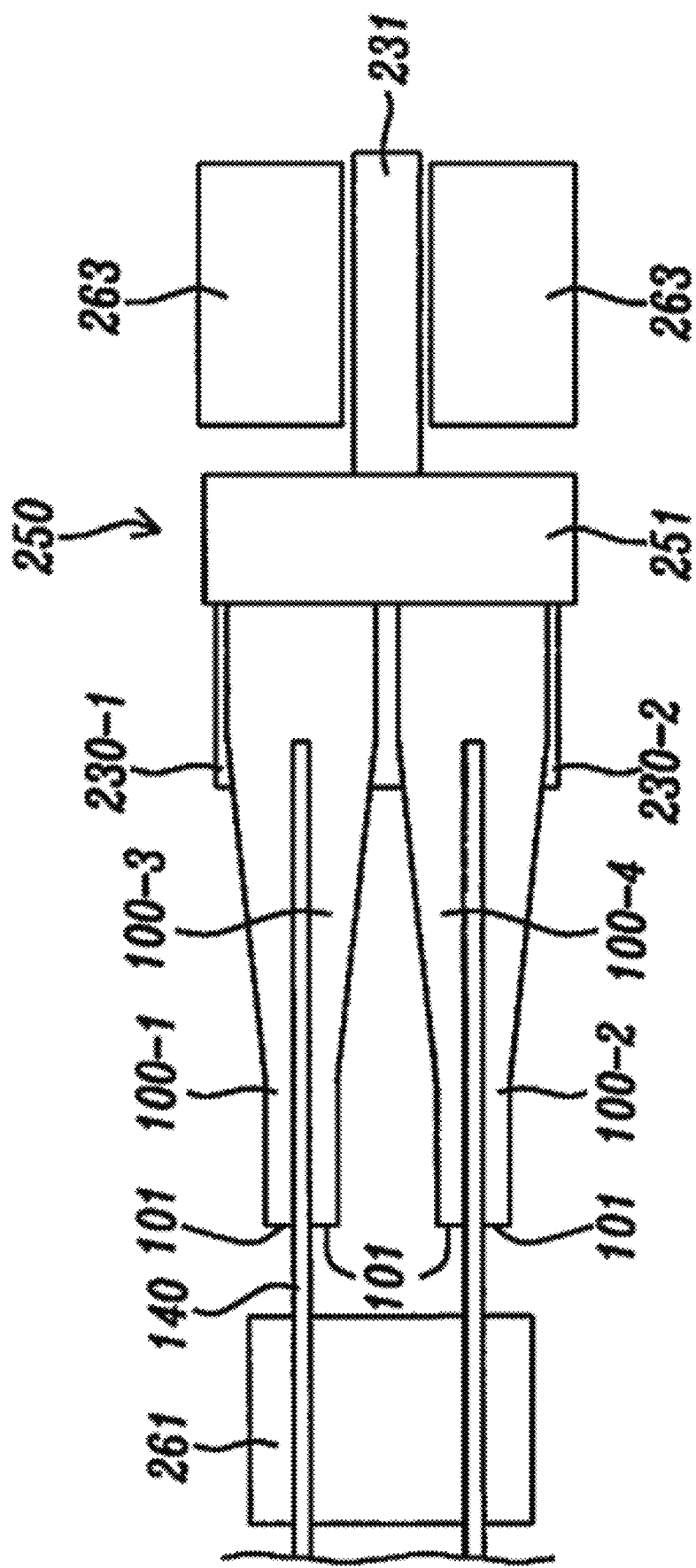
FIG. 2 is side view of a head stack assembly, according to some embodiments of the present disclosure.

Next, a side view of a head stack assembly (FIG. 2) and a plan view of a magnetic recording apparatus (FIG. 3) wherein the magnetic recording head 101 is incorporated are depicted. The head stack assembly 250 is a member to which a plurality of HGAs (HGA 100-1 and second HGA 100-2 are at outer positions while HGA 100-3 and HGA 100-4 are at inner positions) is mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
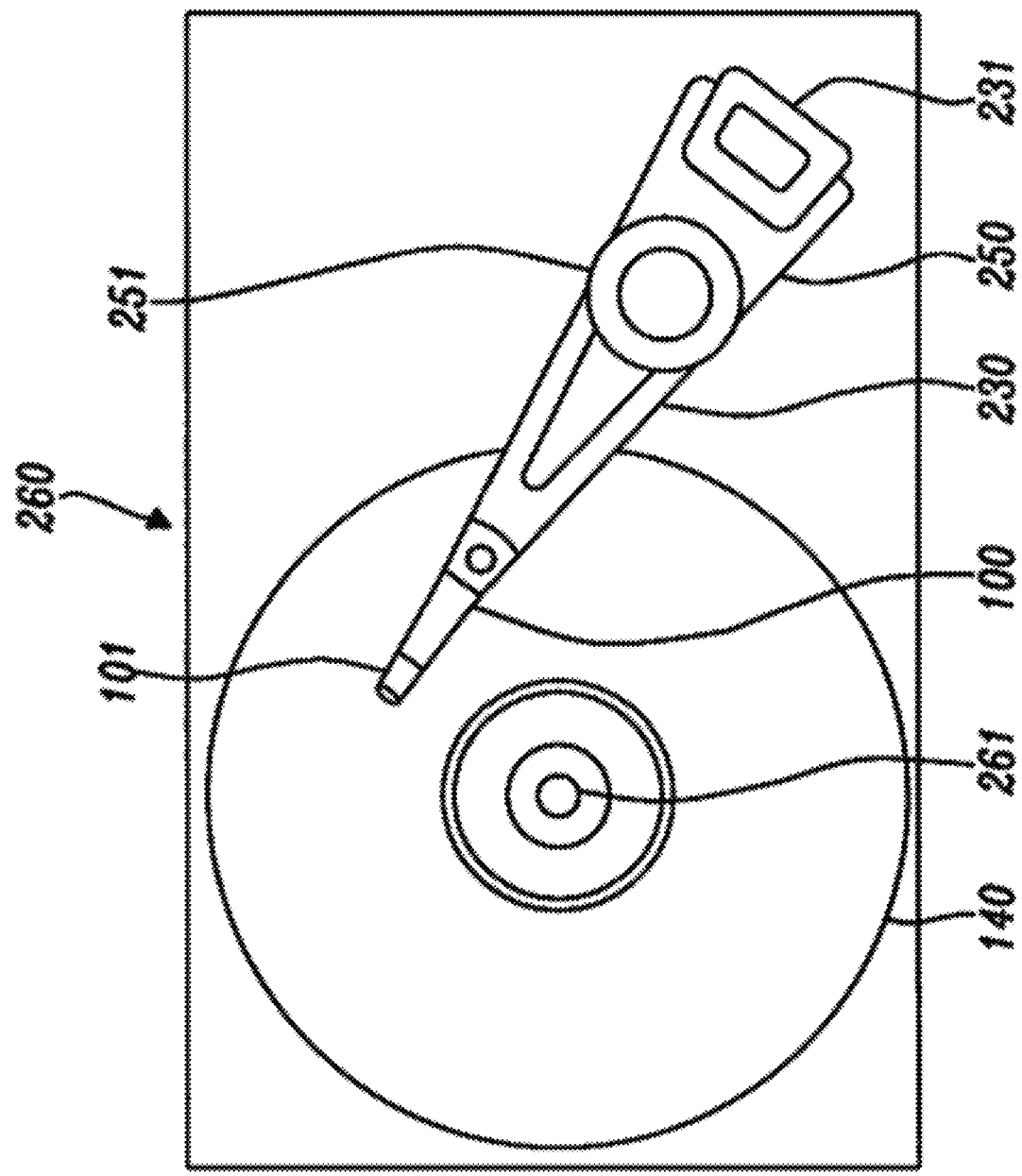
FIG. 3 is a plan view of a magnetic recording apparatus, according to some embodiments of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 101 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magneto-resistive (MR) sensor element (not shown).

Figure 4:
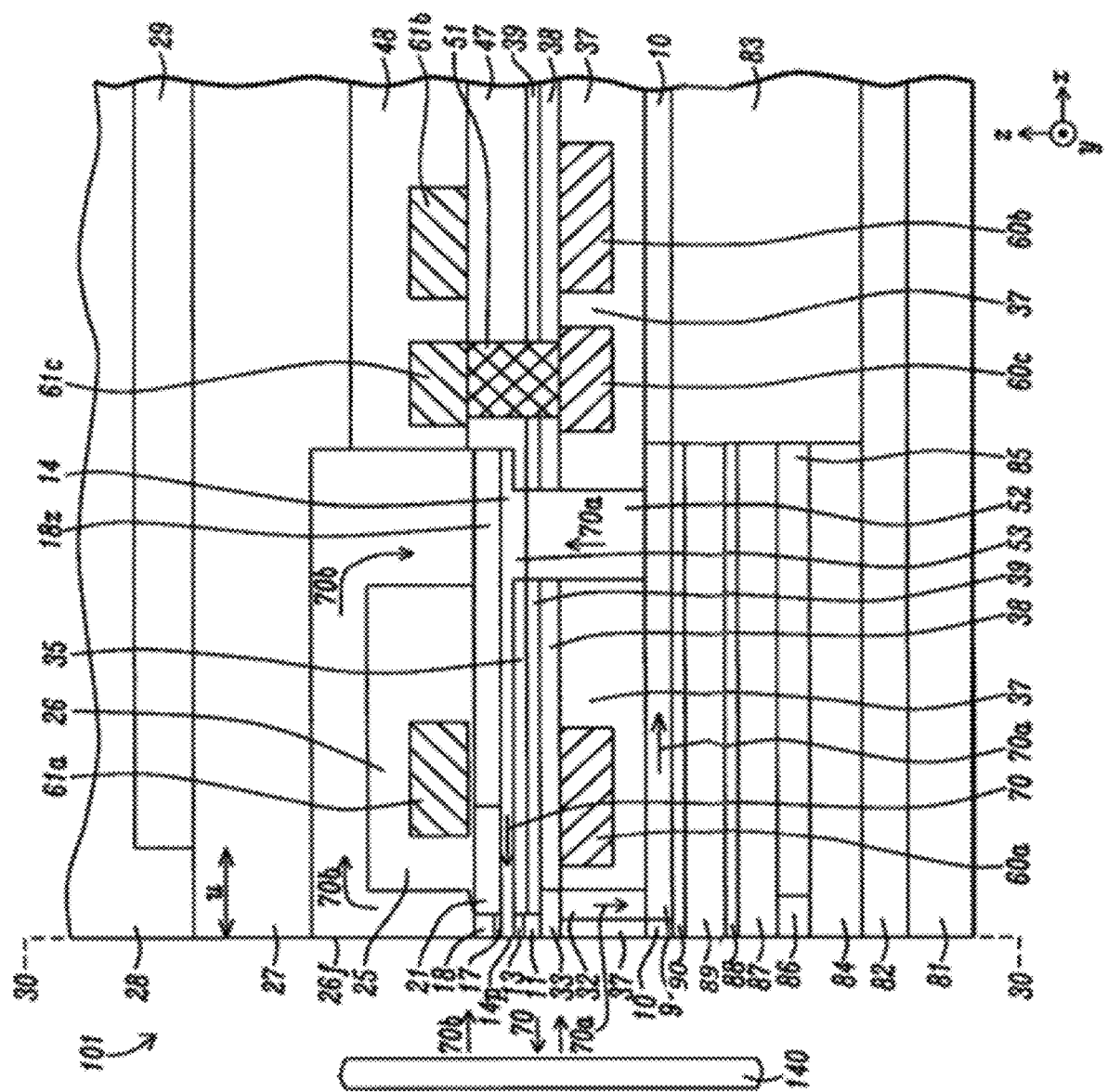
FIG. 4 is a down-track cross-sectional view of a combined read-write head with complete trailing and leading magnetic flux return loops, according to some embodiments of the present disclosure.

Referring to FIG. 4, magnetic recording head 101 comprises a combined read-write head. The down-track cross-sectional view is taken along a center plane (44-44 in FIG. 16) formed orthogonal to the ABS 30-30, and that bisects MP 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

Figure 5:
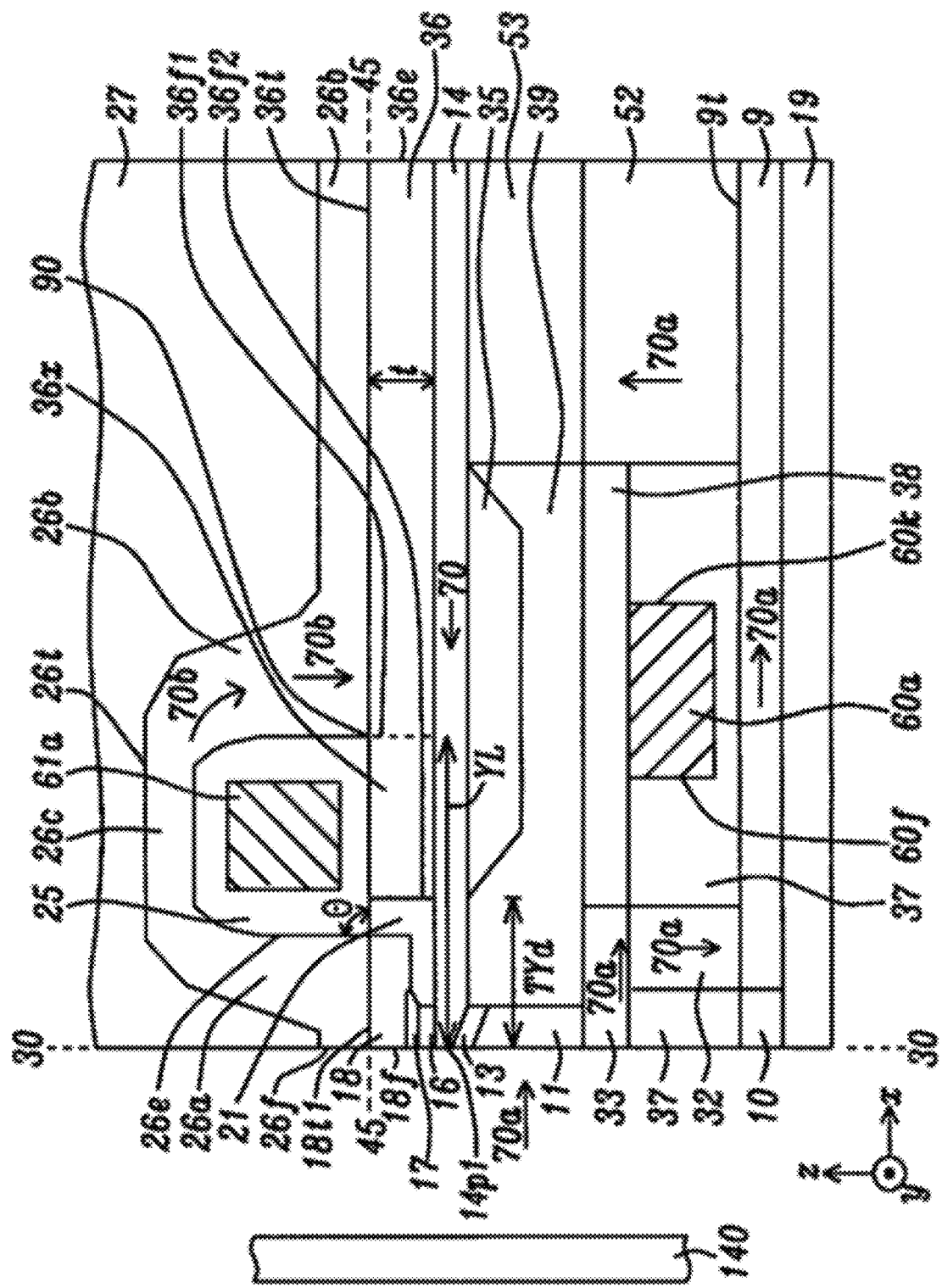
FIG. 5 is a down-track cross-sectional view of a PMR writer having a uDY design for the trailing loop and a rDWS BGC layout for the leading loop, according to some embodiments of the present disclosure.

A magneto resistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a second top shield (S2B) layer 89 and an insulation layer 90 are sequentially formed on the top magnetic shield. Note that layer 9 may be a non-magnetic layer such as an AlOx layer or a magnetic layer served as a flux return path (RTP) in the write head portion of the combined read/write head. Thus, the portion of the combined read/write head structure formed below layer 9 in FIG. 5 is typically considered as the read head. In other embodiments (not shown), the read head may have a dual reader design with two MR sensors, or a multiple reader design with multiple MR sensors.

Various configurations of a write head may be employed with the read head portion. In some embodiments, magnetic flux 70 in MP 14 is generated with flowing a current through bucking coil 60 a-c and driving coil 61 a-c where front portions 60 a and 61 a are below and above the MP, respectively, center portions 60 c and 61 c are connected by interconnect 51, and back portions 60 b and 61 b are connected to writer pads (not shown). Magnetic flux 70 exits the MP at pole tip 14 p at the ABS 30-30 and is used to write a plurality of bits on magnetic media 140. Magnetic flux 70 b returns to the MP through a trailing loop comprised of a trailing shield structure including HS layer 17, WS 18, and uppermost trailing (PP3) shield 26, and top yoke 18 x. There is also a leading loop with a recessed DWS (rDWS) BGC layout for magnetic flux 70 a return to the MP where LSC 32 and RTP 9 are recessed from the ABS 30-30. The rDWS BGC design features leading shield (LS) 11, leading shield connector (LSC) 33, S2 connector (S2C) 32, return path (RTP) 9, lower back gap (LBG) 52, and back gap connection (BGC) 53. In another embodiment (not shown), only the LS is retained in the leading return loop in a so-called non-dual write shield (nDWS) scheme where the LSC, S2C, RTP, LBG, and BGC are omitted to enhance magnetic flux in the trailing loop. The magnetic core may also comprise a bottom yoke 35 below the MP.

Dielectric layers 10, 13, 21, 37-39, and 47-48 are employed as insulation layers around magnetic and electrical components. A protection layer 27 covers the PP3 shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Typically, a dynamic fly height (DFH) heater (not shown) is formed in one or more insulation (dielectric) layers in each of the read head and write head to control the extent of thermal expansion (protrusion) at the ABS and toward a magnetic medium during a read process and write process, respectively. Read gap (RG) and write gap (WG) protrusion may be tuned by the placement of the DFH heaters, and by the choice of metal or alloy selected for the DFH heaters since each DFH heater is comprised of a resistor material with a particular thermal and mechanical response to a given electrical input.

Figure 16:
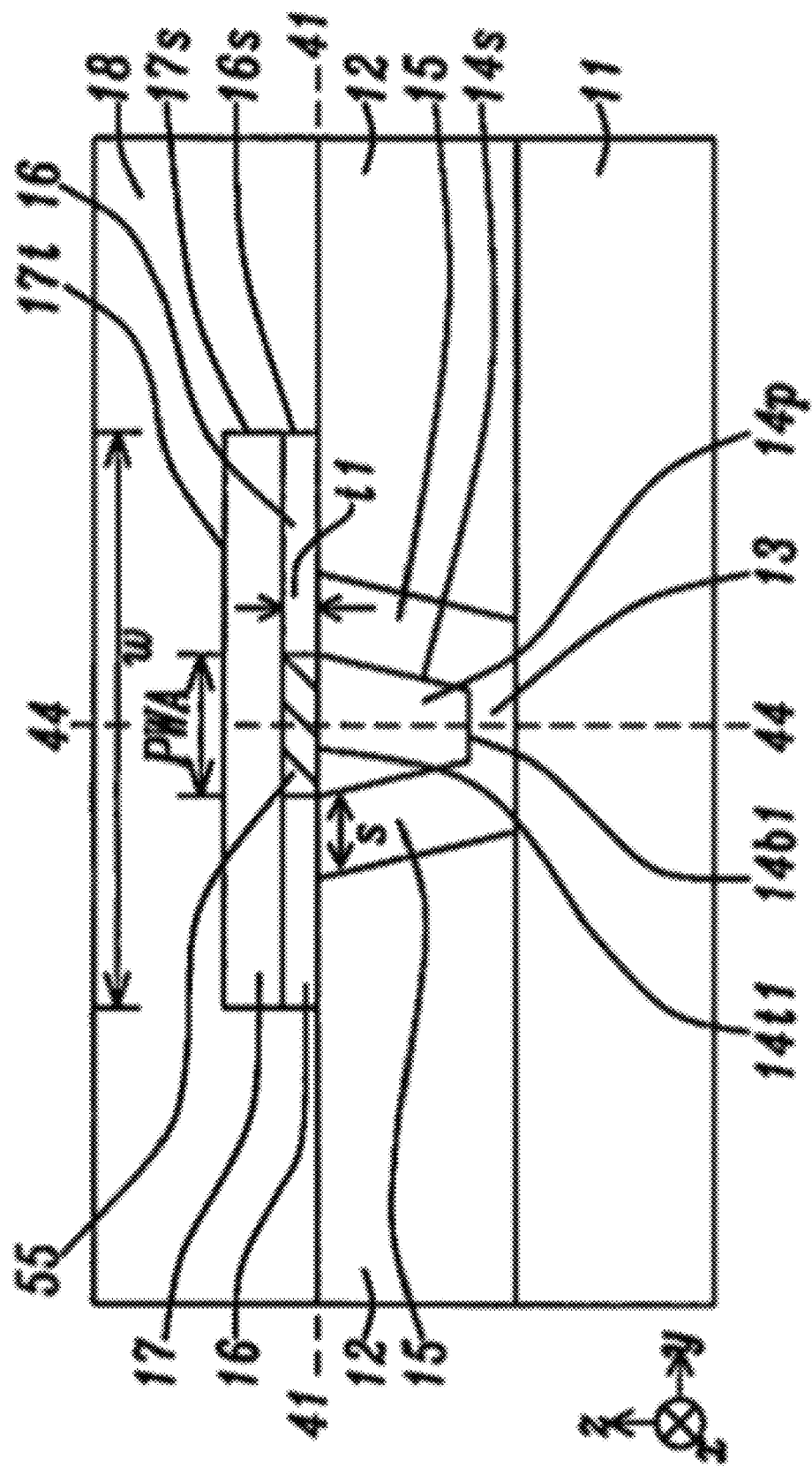
FIGS. 16-20 are ABS views where a NM metal layer is formed in one or both of the WG and side gaps to provide electrical contact between the MP tip and the HS layer and SS, respectively, according to some embodiments of the present disclosure.

Referring to FIG. 5, an enlargement of a write head portion of a combined read-write head is shown according to some embodiments and is a down-track cross-sectional view taken along center plane 44-44 in FIG. 16, for example. A uDY rDWS BGC base writer design is shown where the trailing loop has an ultimate double yoke (uDY) scheme, and the leading loop has a rDWS BGC layout. Bucking coil front portion 60 a has front side 60 f that is recessed from the ABS 30-30, backside 60 k facing LBG 52, and is formed in insulation layer 37 and above RTP top surface 9 t. RTP 9 is formed on bottommost insulation layer 19. Leading shield (LS) 11 contacts a top surface of LS connector (LSC) 33 at the ABS. Insulation layer 38 adjoins a backside of the LSC and extends to a BGC front side. The leading loop for flux return 70 a continues from the LS and LSC through S2C 32 and the RTP before passing upward through the lower back gap (LBG) 52 and BGC 53. The BGC contacts a bottom surface of MP 14 behind tapered bottom yoke (tBY) 35. Insulation layer 39 extends from the LS backside to the BGC front side and contacts a top surface of insulation layer 38. The tBY 35 is formed within insulation layer 39, and between the LS and BGC.

The trailing loop comprises HS layer 17, WS 18 with front side 18 fat the ABS 30-30, PP3 TS 26 that has front side 26 fat the ABS, and TY 36 with top surface 36 t adjoining the PP3 TS behind driving coil (DC) 61 a so that magnetic flux 70 b from magnetic medium 140 is able to return to MP 14. DC 61 a is formed above insulation layer 21 and is surrounded on the sides and top and bottom surfaces with insulation layer 25. PP3 TS top surface 26 t arches (dome shape) over DC front portion 61 a. Protection layer 27 covers the PP3 TS and is made of an insulating material such as alumina. Note that the TY has a thickness t, and height d between a front side 36 f 1 and backside 36 e where the front side is directly below the inner corner 90 of the PP3 TS where the PP3 TS contacts plane 45-45.

The uDY aspect of the trailing loop is related to the feature where the TY is comprised of a TY extension 36 x having a front side 36 f 2 that is recessed a distance TYd of 0.8 to 1.3 microns from ABS 30-30, and a backside that interfaces with TY front side 36 f 1. Yoke length (YL) is defined as the distance between the ABS and TY front side 36 f 1. The TY extension has a thickness t of 0.3-0.8 microns, which is equal to that of TY 36. The PP3 TS has a middle portion 26 c with a dome shaped top surface 26 t formed above driving coil front portion 61 a. A front portion 26 a of the PP3 TS is formed on WS 18 and has an inner side 26 e that forms an apex angle θ, preferably from 60 degrees to 80 degrees, with respect to plane 45-45 that comprises TY top surface 36 t and is orthogonal to the ABS. A back portion 26 b of the PP3 TS adjoins a top surface of TY 36. The PP3 TS apex angle is believed to enhance flux concentration at WS 18 and provides improved high data rate performance. A key feature is that TYd is less than YL. Driving coil front portion 61 a is entirely above plane 45-45 and TY extension 36 x, and within insulation layer 25.

Leading shield 11, LSB 33, S2C 32, LBG 52, BGC 53, and RTP 9 are generally made of NiFe, NiFeRe, CoFe, CoFeN, CoFeNi or the like with a saturation magnetization (Ms) value of 4 kiloGauss (kG) to 16 kG. WS 18, PP3 TS 26 a-26 c, TY 36, and TY extension 36 x are typically made of NiFe, NiFeRe, CoFe, CoFeNi, or CoFeN having a Ms 10 kG to 19 kG while HS layer 17 and MP 14 have a Ms from 19 kG to 24 kG. In this scheme, the tBY 35 contacts a bottom surface of MP 14 below the TY extension. Although the PP3 TS 26 a-c has a front side 26 fat the ABS, the front side may be recessed from the ABS 30-30 in other embodiments (not shown).

Figure 6:
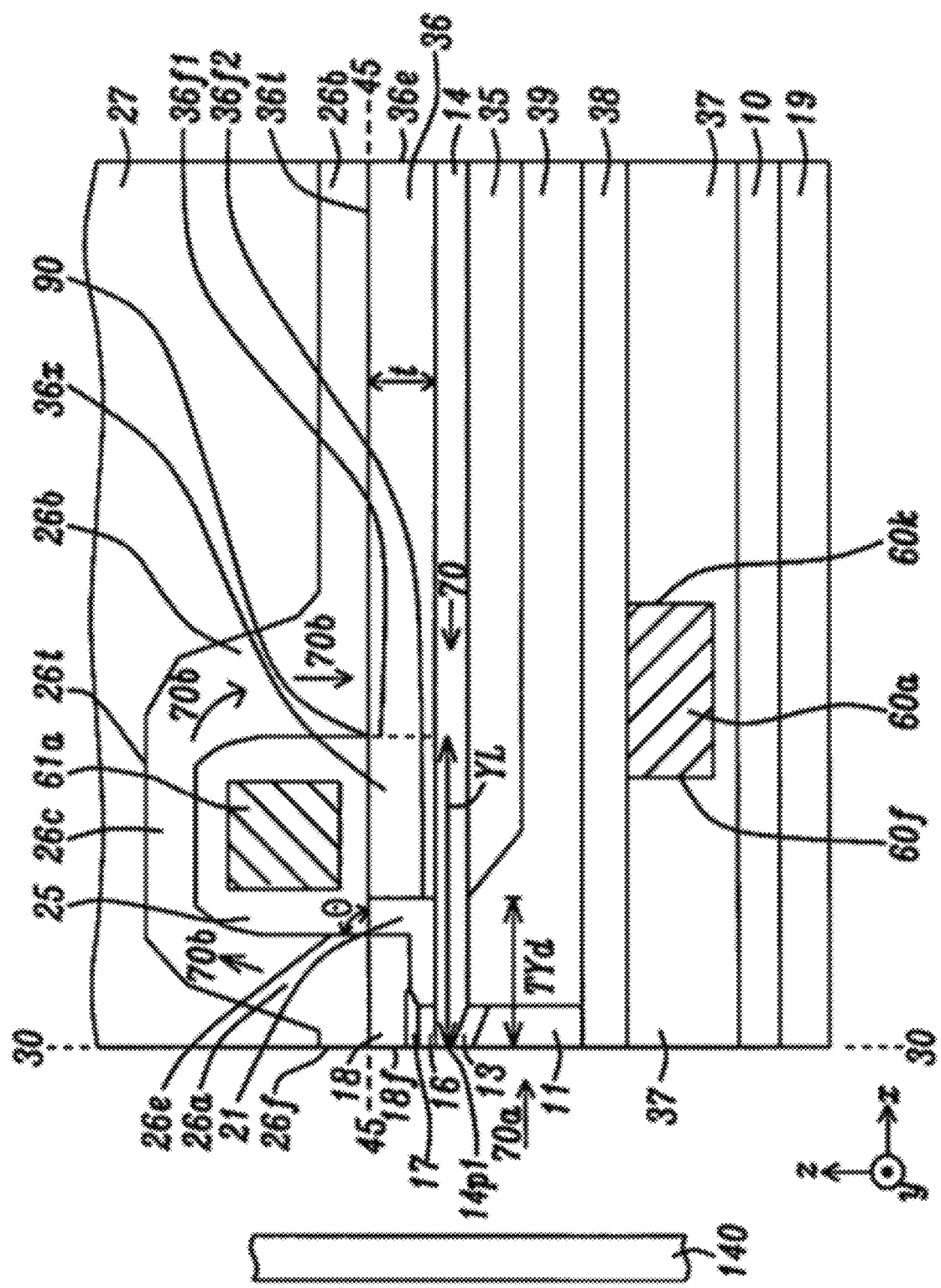
FIG. 6 is a down-track cross-sectional view of a PMR writer having a uDY design for the trailing loop and a nDWS layout for the leading loop, according to some embodiments of the present disclosure.

FIG. 6 depicts a writer with a uDY trailing loop and a nDWS layout for the leading loop according to another writer scheme according to some embodiments wherein the leading loop terminates at leading shield 11. The nDWS approach is beneficial in providing a better return field at the MP trailing edge thereby improving field gradient, BER, and ADC compared with the rDWS BGC layout but at the expense of a worse nearby ATE.

Figure 7:
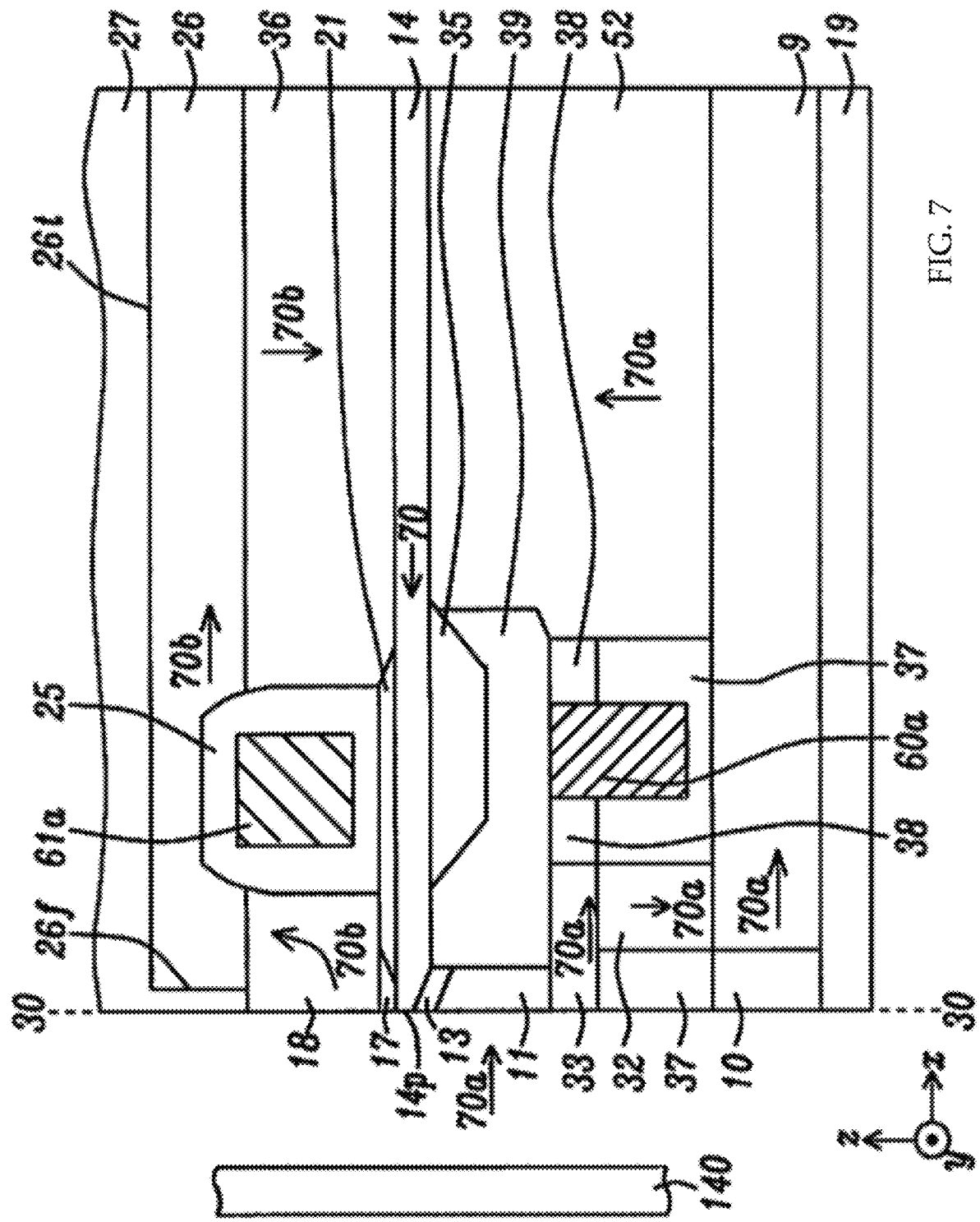
FIG. 7 is a down-track cross-sectional view of a PMR writer having an ePL design for the trailing loop and a rDWS BGC layout for the leading, according to some embodiments of the present disclosure.

Referring to FIG. 7, another writer scheme is depicted according to some embodiments and features an ePL trailing loop and a rDWS LBG leading loop. In this case, the LBG/BGC stack in the rDWS BGC layout described previously is replaced with LBG 52 that extends upward from RTP 9 to a back portion of MP 14. With the ePL scheme, the PP3 TS 26 in the trailing loop is modified to have a flat top surface 26 *t*, and front side 26 *f* is recessed from the ABS 30-30. However, in other embodiments (not shown) the PP3 TS front side may be at the ABS to satisfy thermo-magnetic requirements because of a larger metal area at the ABS. Moreover, an exposed PP3 TS front side at the ABS means fewer process steps and is preferred when wide adjacent track erasure (WATE) from the PP3 TS, and PP3 TS to WS 18 interface is manageable.

Figure 8:
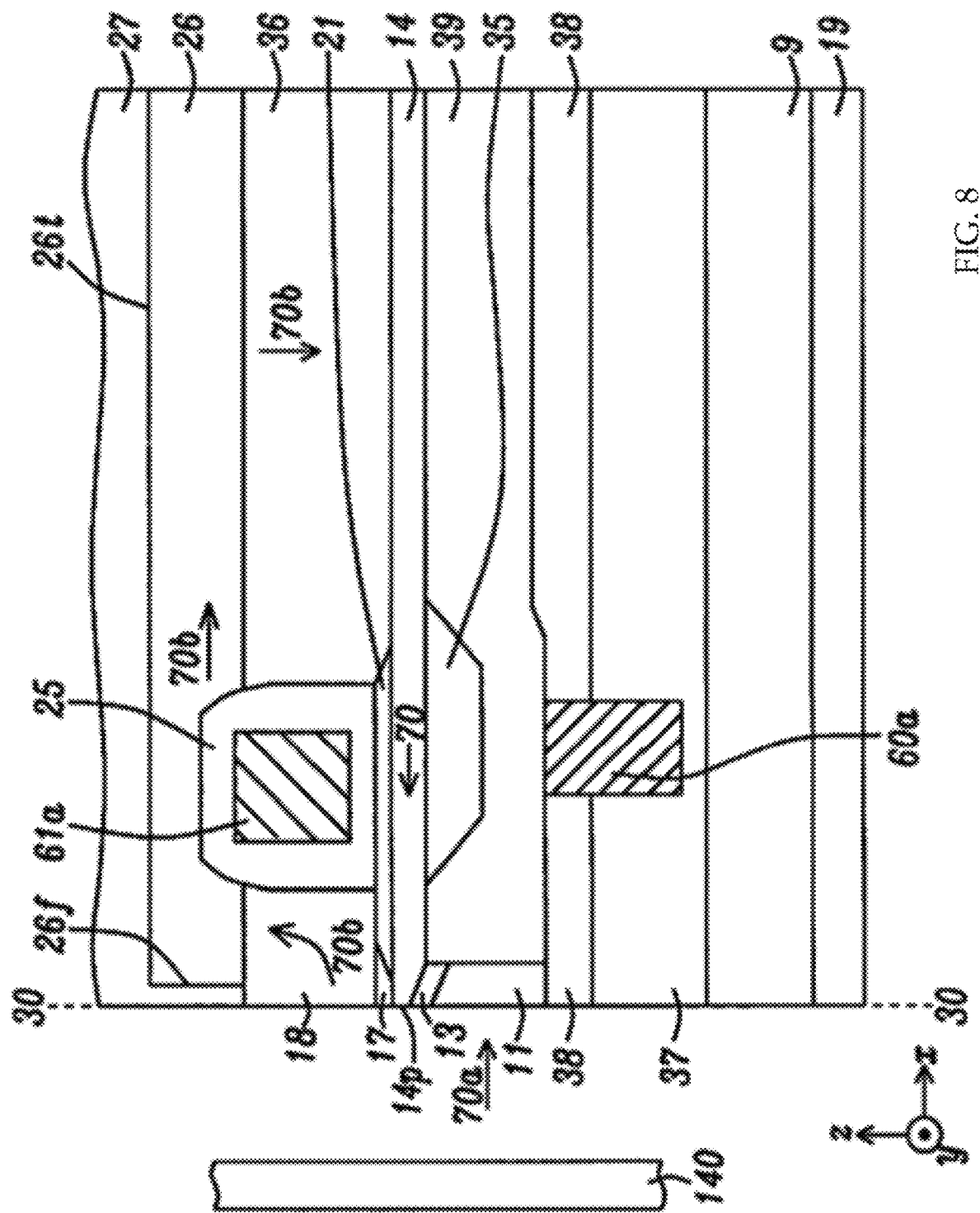
FIG. 8 is a down-track cross-sectional view of a PMR writer having an ePL design for the trailing loop and a nDWS layout for the leading loop, according to some embodiments of the present disclosure.

Referring to FIG. 8, an ePL nDWS base writer structure according to some embodiments is shown wherein the ePL design from FIG. 8 is retained, but the LSC 33, S2C 32, RTP 9, and LBG 52 are removed so that the leading loop terminates at LS 11. This scheme has the same advantage as the nDWS base structure in FIG. 7 in terms of a better return field at the MP trailing edge compared with the ePL rDWS LBG writer structure, but at the expense of a worse nearby ATE.

All of the writer structures shown in FIGS. 5-8 depict a single PMR writer. However, the present disclosure also anticipates a selectable dual PMR writer (SDW) or selectable triple PMR writer (STW) wherein only the better or best performing writer is selected for a write process. When two or more PMR writers (not shown) are formed on a slider, each writer may be fully separated from an adjacent writer with a separate PP3 TS 26 *a*-26 *c*, HS layer 17, WS 18, LS 11, LSB 33, S2C 32, RTP 9, LBG 52, and BGC 53 as well as having a separate MP 14, tBY 35, TY extension 36 *x*, and TY 36. In another embodiment (not shown), the two or more writers may share a PP3 TS, WS, LS, LSB, S2C, and RTP, but have separate LBG, BGC, tBY, HS layer, TY extension, TY, and MP. In yet another embodiment, all magnetic components in the leading and trailing loops are shared except for the tBY, MP, TY extension, and TY.

Figure 9A:
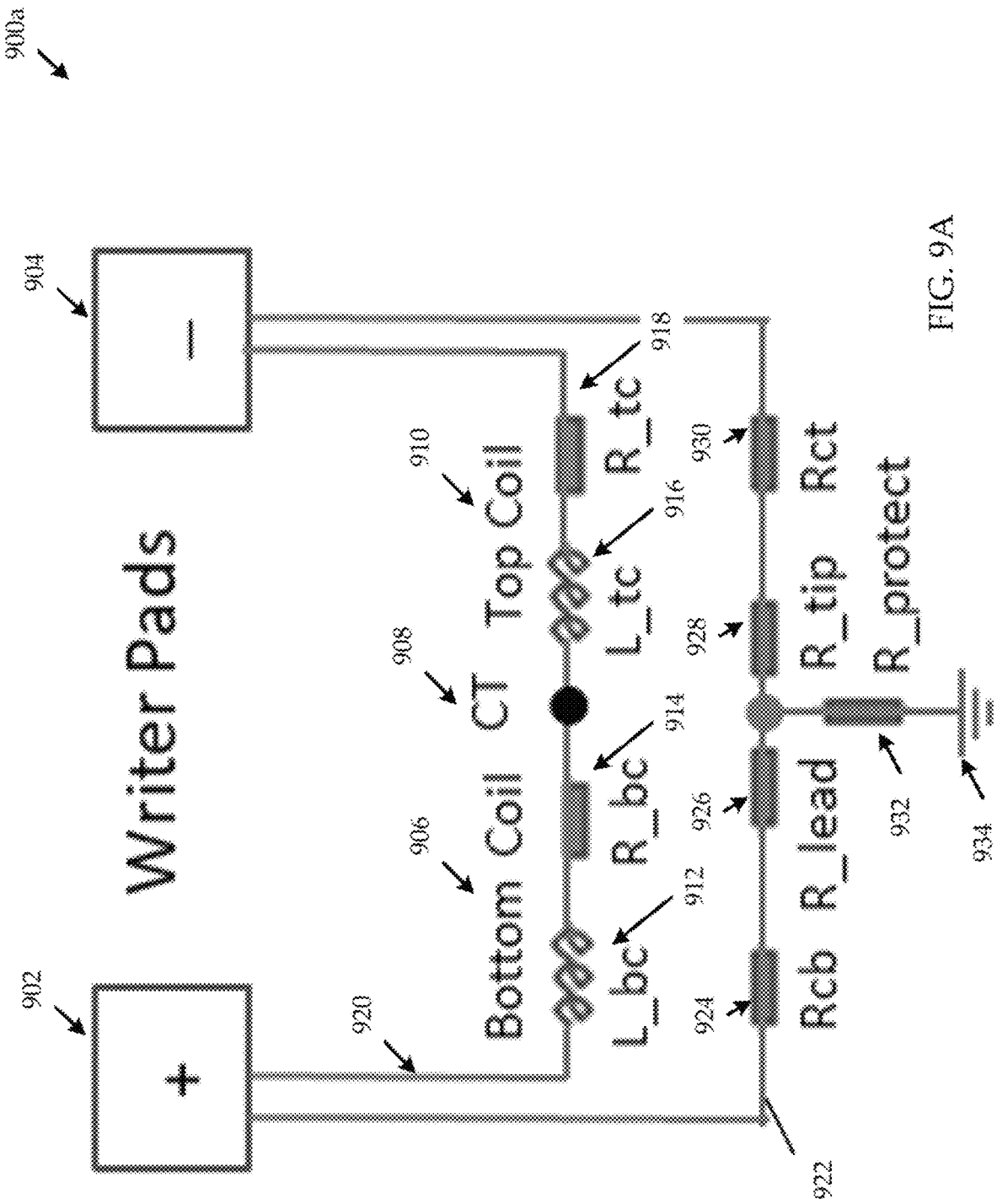
FIGS. 9A-9B illustrate example electric circuits of a PMR writer with double driving coil (DDC) designs, according to some embodiments of the present disclosure.
Figure 9B:
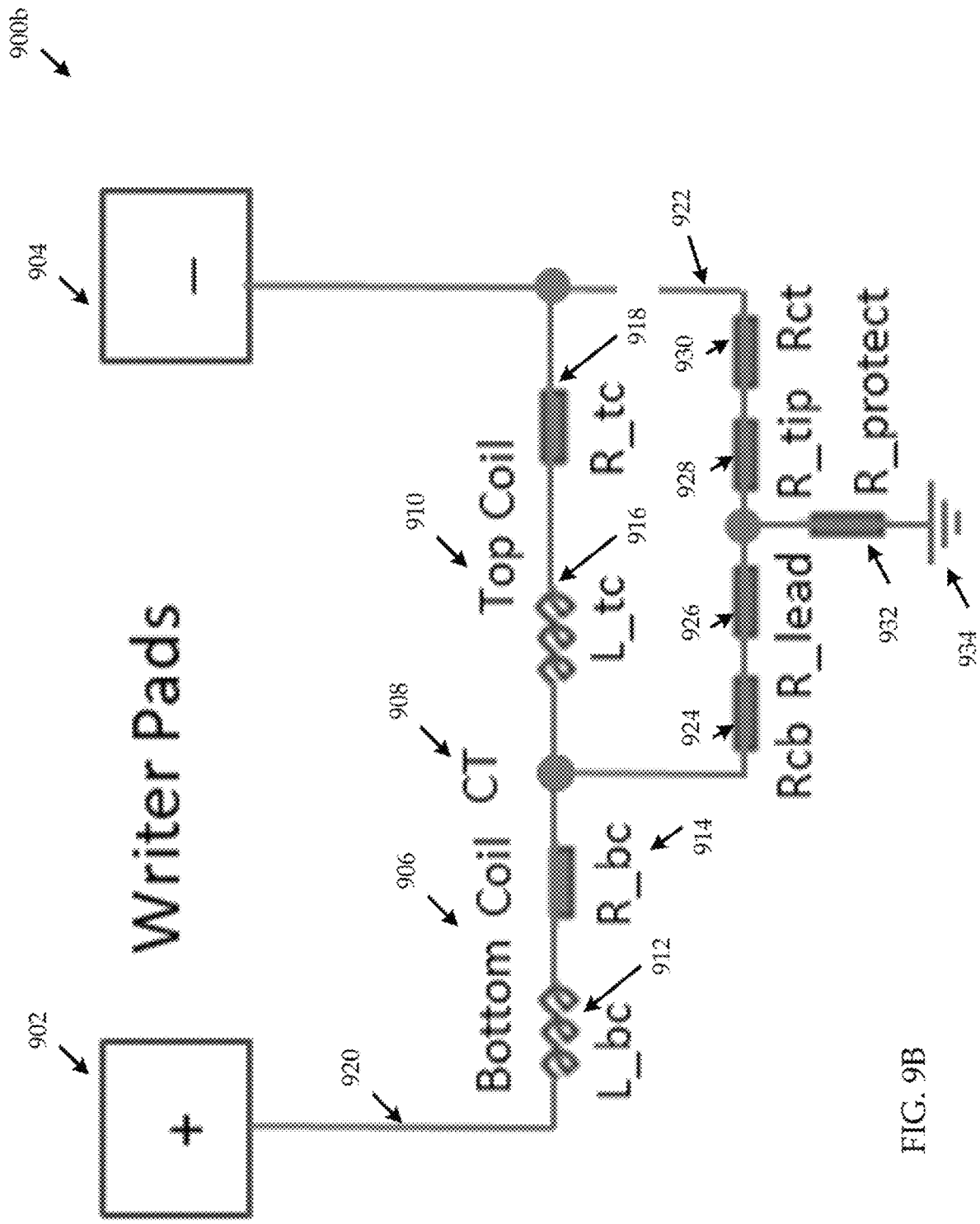

FIGS. 9A-9B illustrate circuits of PMR writers with double driving coil designs, according to some embodiments of the present disclosure. The circuit 900*a* as shown in FIG. 9A can include a double driving coil connected to two writer pads, with current flowing in parallel to writer coil and routing in the same direction as top coil either from writer shield to MP or from MP to writer shield.

As shown in FIG. 9A, the circuit 900*a* can include writer pads 902, 902. For example, a first writer pad 902 can include a positive voltage pad and a second pad 904 can include a negative voltage pad. Further, a bottom coil 906 and top coil 910 can be electrically connected between a center tap (CT) 908 and in series between pads 902, 904. For example, a bottom coil 906 can include a coil element (L_bc) 912 and a resistor (R_bc) 914, and a top coil 910 can include a coil element (L_tc) 916 and a resistor (R_tc) 918. A first current flow 920 can flow between the bottom coil 906 and top coil 910 between pads 902, 904.

Further, the circuit 900*a* can include a set of resistors electrically connected in series between pads 902, 904. For instance, a first resistor (Rcb) 924 and a lead resistor (R_lead) 926 can be connected in series. Further, a tip resistor (R_tip) 928 and a second resistor (Rct) 930 can be electrically connected in series. A protect resistor (R_protect) 932 can be disposed between R_lead 926 and R_tip 928, and R_protect 932 can be connected to a ground 934.

The circuit 900*b* as shown in FIG. 9B can include the double driving coil connected in parallel to top coil branch with the routing in the same direction as top coil either from writer shield to MP or from MP to writer shield. As shown in FIG. 9B, a bottom coil 906 and top coil 910 can be connected in series between pads 902, 904. Further, disposed between bottom coil 906 and top coil 910 can include a set of resistors. The set of resistors can include Rcb 924, R_lead 926, R_tip 928, and Rct 930 electrically connected in series. The protect resistor (R_protect) 932 can be disposed between R_lead 926 and R_tip 934.

The position of the DDC loop in down track direction can be above a MP (e.g., 14) and below the top coil (which is also called driving coil 61). In addition to R_lead, which can reflect MP and writer shield resistance, and R_tip, which can reflect the metallic contact resistance between MP and shield at MP tip region from various contacting schemes (e.g., as shown in FIG. 16-23), Rct and Rcb can be built-in series control resistors. The resistances of Rct and Rcb may not only to provide design required bias current to MP tip region, but also to maintain relatively low voltage potential at MP tip and writer shield during writing operation. For example, in the circuit 900*a* in FIG. 9A, Rct 930 can be connected to the top coil pad (e.g., 904) and Rcb 924 can be connected to bottom coil pad (e.g., 902). In FIG. 9B, Rct 930 can be connected to one side of top coil 910 that is routed to top coil pad 904 and Rcb 924 can be connected to one side of top coil 910 that is routed to the center tap (CT) 908. Note that writer components except for the writer pads are omitted to more clearly show that circuit 922 comprising the MP tip runs parallel to the top coil circuit 920 where the circuit 922 has a total resistance (Rcb+R_lead+R_tip+Rct). As write shield is electrically connected to MP tip and connected to the top driving coil, R_protect (~20 kOhm or higher up to fully open) can be used to isolate the top coil from preamp ground which is connected to writer heater DFH ground (−) in HDD operation. The MP tip can be electrically connected to one or both of HS layer 17 and SS 12 through a NM metal layer (e.g., as shown in FIGS. 16-20). MP tip resistance (R_tip) can be tuned by adjusting the volume of NM metal in contact with the MP tip, as well as the NM metal composition. The double driving coil design as described herein can be incorporated in a PMR writer without changing the existing pad layout in many write head designs.

Figure 10A:
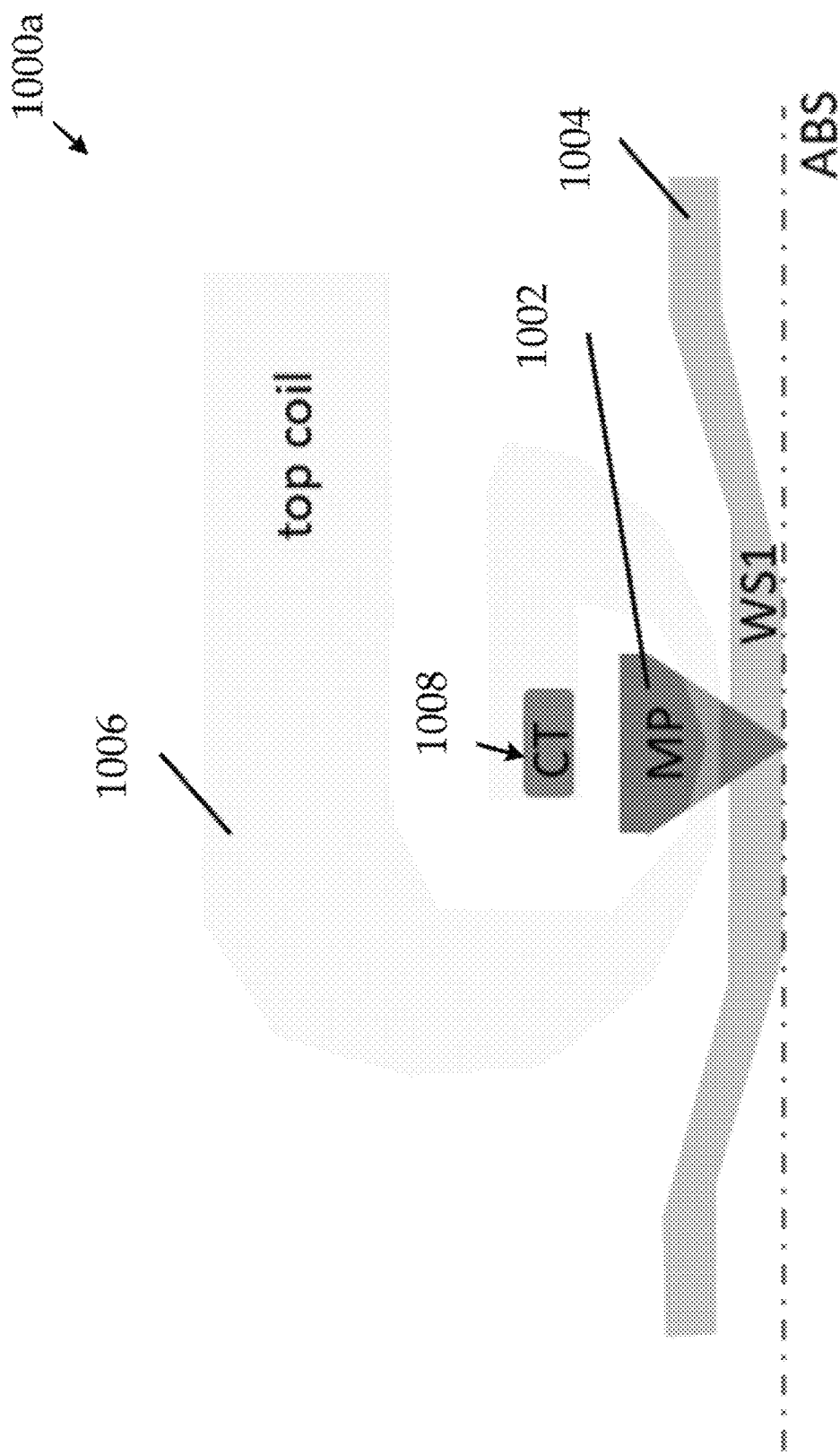
FIGS. 10A-10F illustrate views of a non-DDC design and various DDC designs, according to some embodiments of the present disclosure.

FIGS. 10A-10F illustrate various schematics of write heads 1000*a*-*f* with a DDC circuit formed in the writer. For example, as shown in FIG. 10A, a write head 1000*a* can include a head without the inclusion of a DDC design. For example, a write shield (WS1) 1004 can be disposed near a tip portion of the main pole 1002. Further, a top coil 1006 can be disposed around the main pole 1002, with a CT 1008 disposed above the main pole 1002.

Figure 10B:
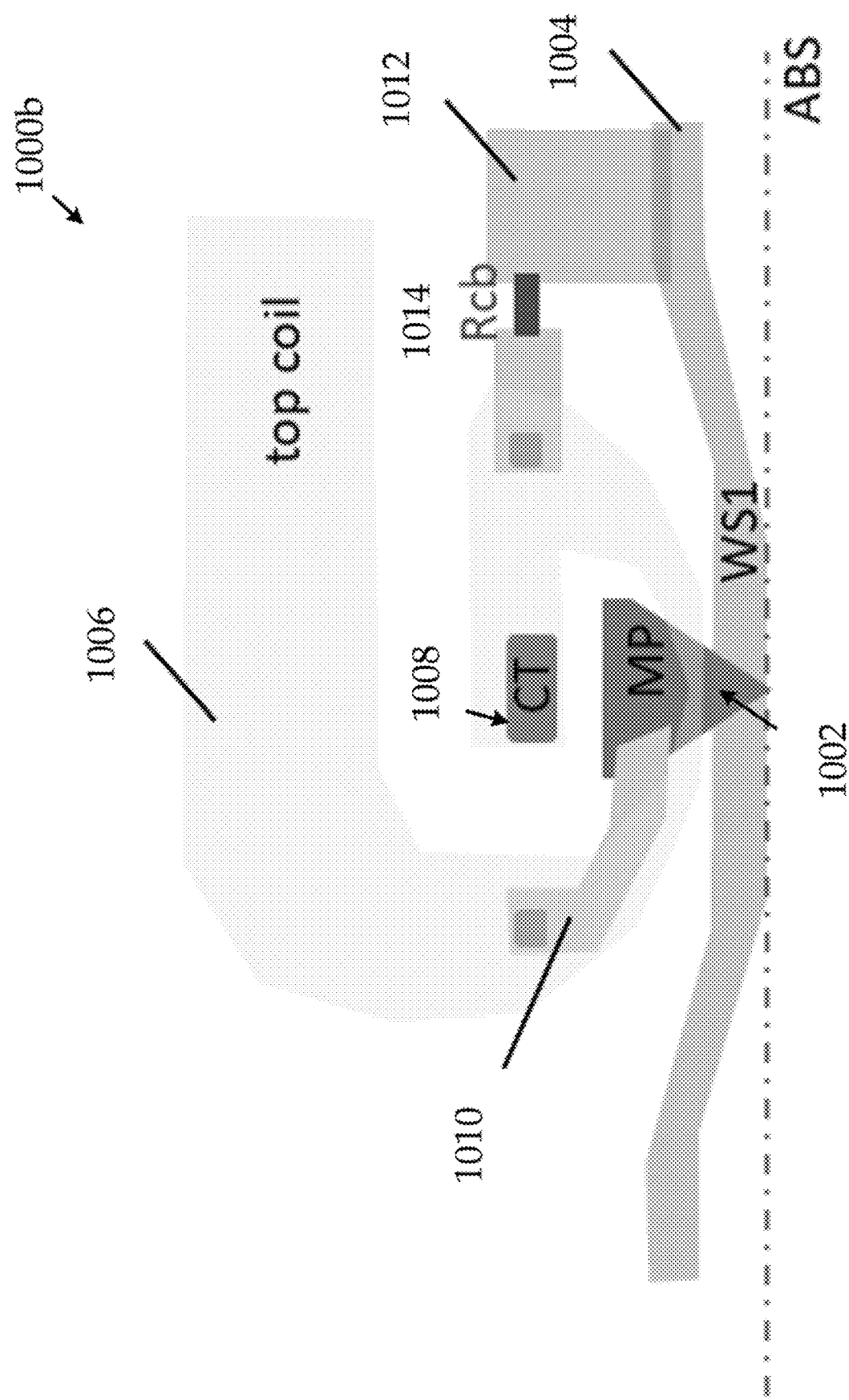

FIG. 10B illustrates a write head 1000*b* with a DDC design including a MP connected to a left side of the top coil including series resistor (Rcb). As shown in FIG. 10B, the MP 1002 can be connected to a left side of the top coil 1006 through an under path 1010. Further, WS1 1004 can be connected to right side of the top coil 1006 through an under path 1012 and a series resistor Rcb 1014.

Figure 10C:
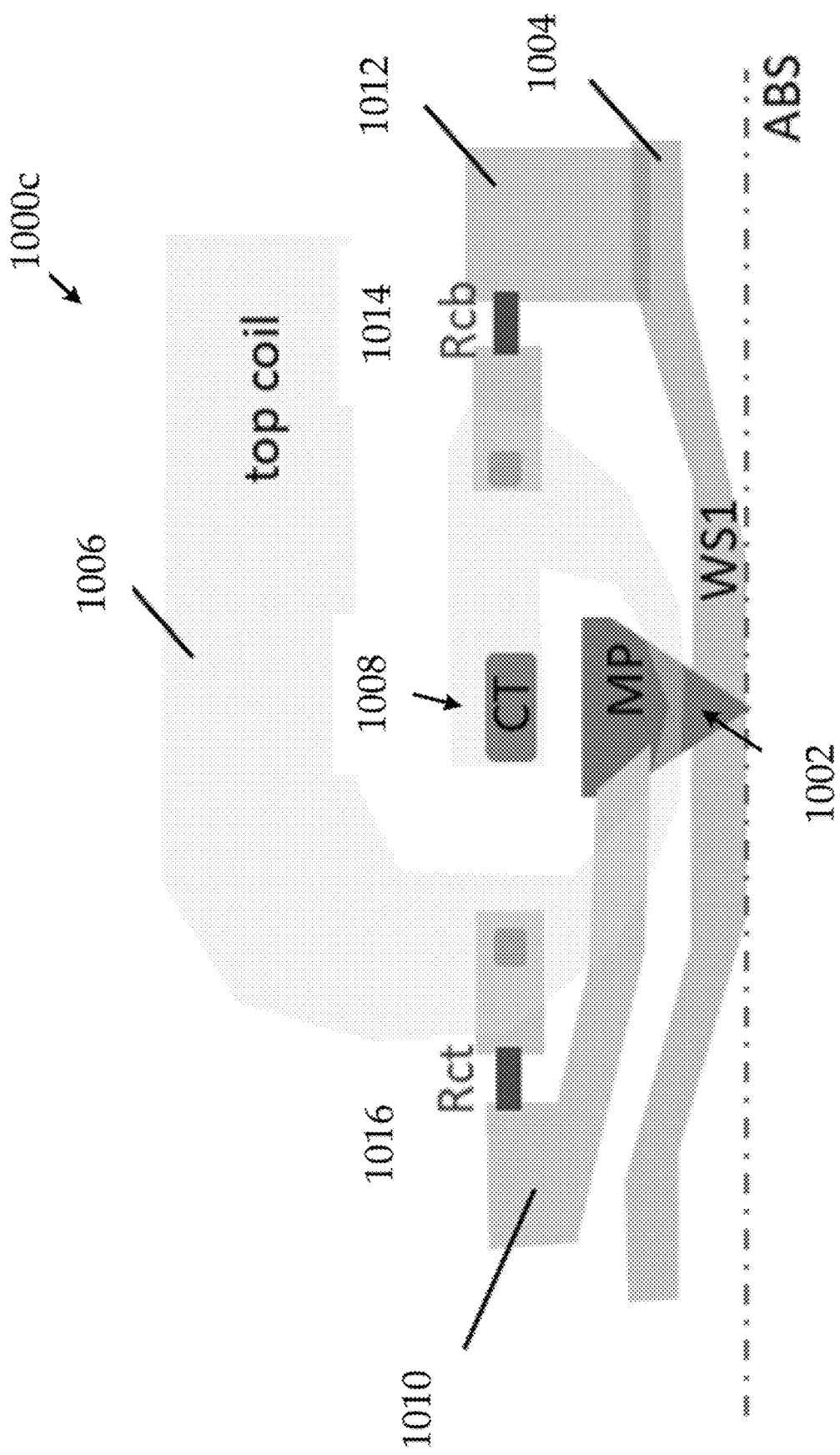

FIG. 10C illustrates a write head 1000*c* with a DDC design including a MP connected to a left side of the top coil including both series resistors (Rct and Rcb). As shown in FIG. 10C, MP 1002 can be connected to a left side of the top coil 1006 through an under path 1010 and a series resistor Rct 1016. The MP 1002 can further be connected to WS1 1004 connected to right side of the top coil 1006 through an under path 1012 and a series resistor Rcb 1014.

Figure 10D:
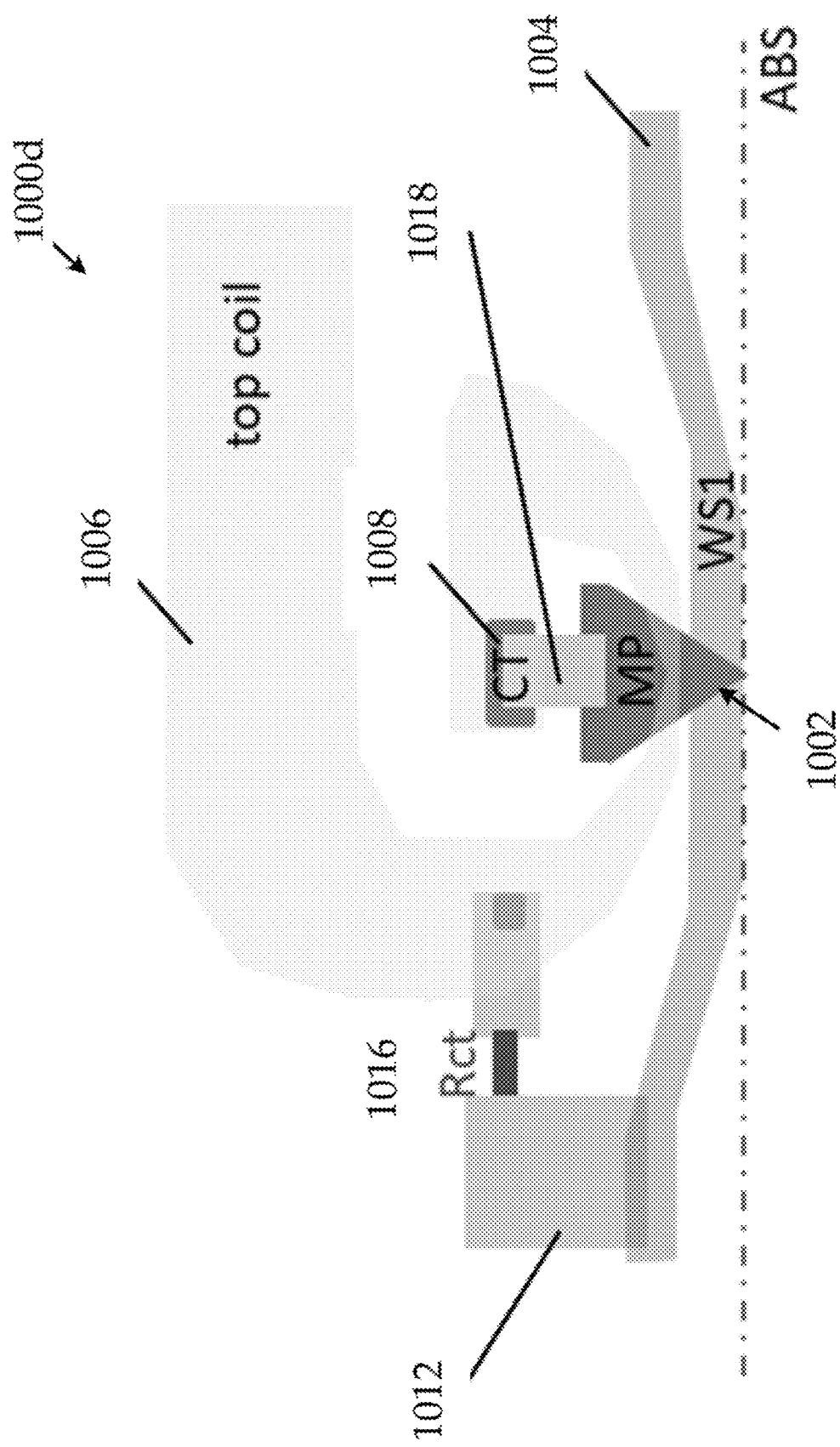

FIG. 10D illustrates a write head 1000*d* with a DDC design including a MP connected to a center tap. As shown in FIG. 10D, the MP 1002 can be connected directly to the center tap (CT) 1008 504 of the top coil 1008 through an under path 1018. Further, the MP 1002 can connect to WS1 1004 that is connected to left side of the top coil 1006 through an under path 1012 and a series resistor Rct 1016.

Figure 10E:
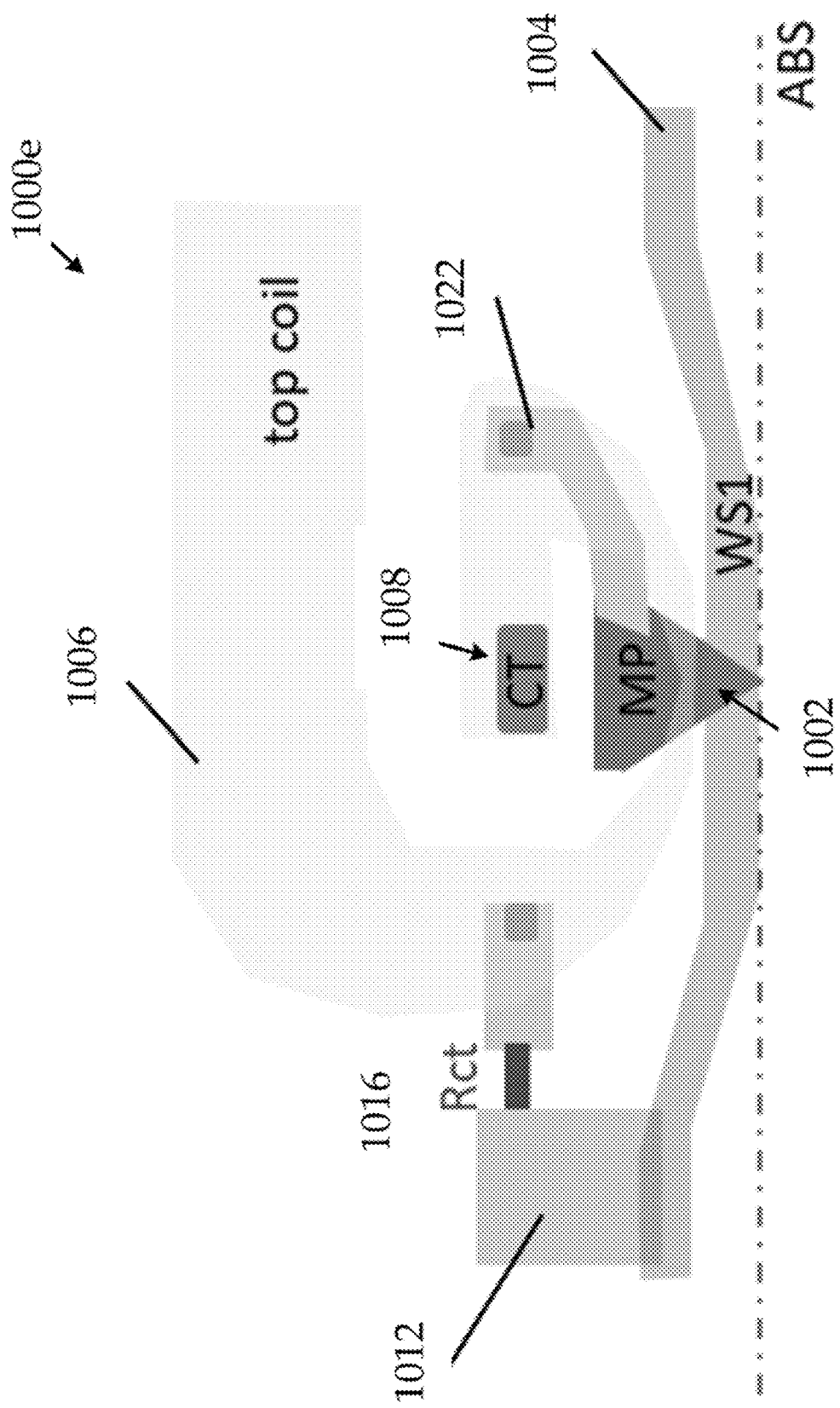

FIG. 10E illustrates a write head 1000e with a DDC design including a MP connected to a right side of the top coil including a series resistor (Rct). As shown in FIG. 10E, the MP 1002 can be connected to right side of the top coil 1006 through an under path 1022. The MP 1002 can connect to WS1 1004 connected to left side of the top coil 1006 through an under path 1012 and a series resistor Rct 1016.

Figure 10F:
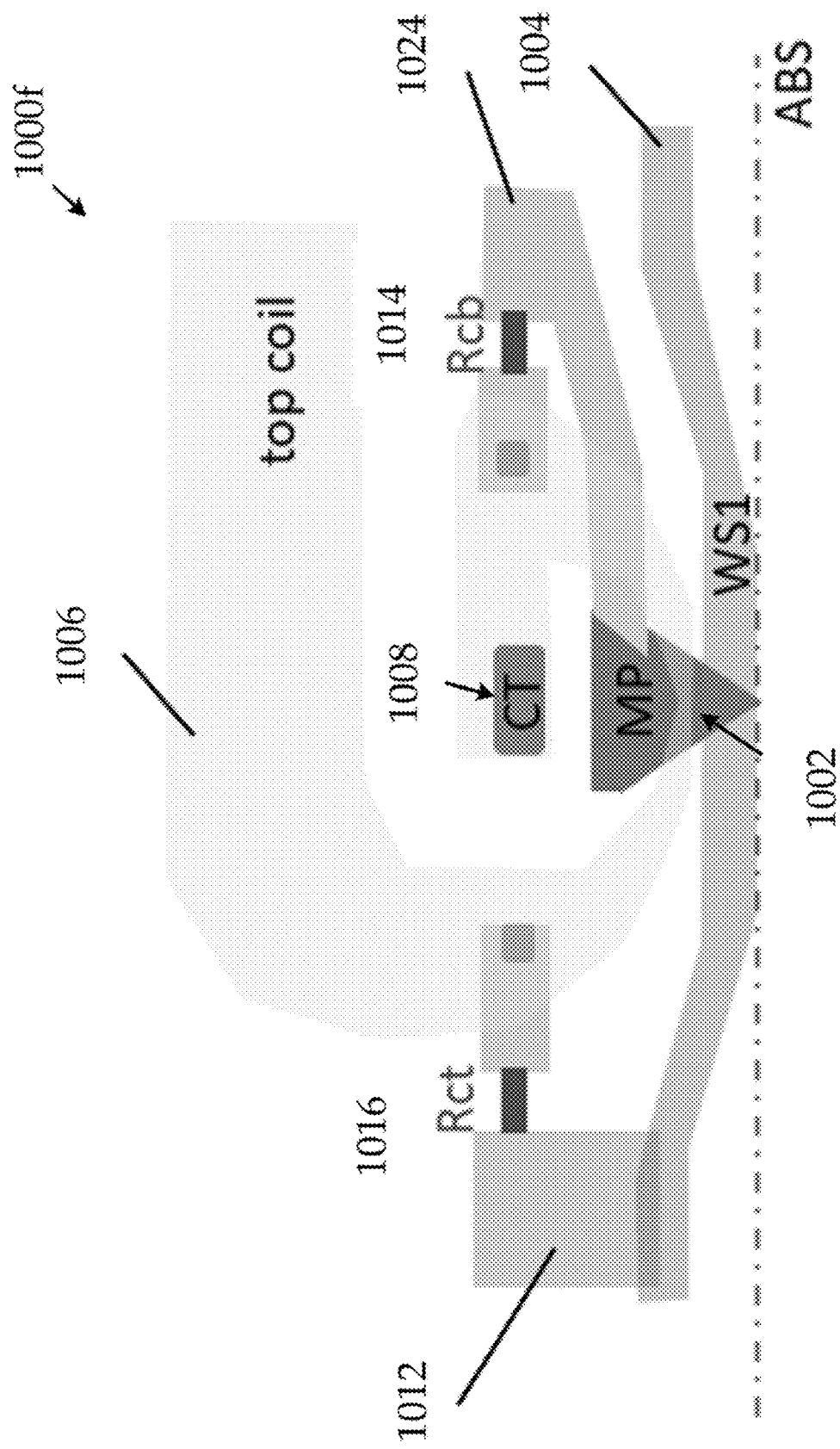

FIG. 10F illustrates a write head 1000f with a DDC design including a MP connected to a right side of the top coil including both series resistors (Rct and Rcb). As shown in FIG. 10F, a MP 1002 can be connected to right side of the top coil 1006 through an under path 1024 and a series resistor Rcb 1014; and WS 1004 connected to left side of the top coil 1006 through an under path 1012 and a series resistor Rct 1016.

When writing current is applied to writer coil, a branch of current can flow through writer shield, MP tip, and MP back gap contact to form a current bias loop in the same routing direction as the top coil. Therefore, the DDC design can form an electric current path through a MP tip region in parallel to the top coil and drives the MP (and TY) in the same direction as the top coil. The additional current bias loop can also heat up the MP tip region and generate an Oersted field near the MP tip region, which can further enhance PMR writer writability and high frequency response. For example, in the circuit 900a as shown in FIG. 9A, the DDC loop may apply the same under path layer to form connection with MP (e.g., 1002) and WS1 (e.g., 1004) and apply the same layer to form Rcb (e.g., 1014) and Rct (e.g., 1016) resistors. As another example, the circuit 900b in FIG. 9B, in many DDC designs, except for one side of the Rcb (e.g., 924), can be connected to the bottom coil pad (e.g., 902) and one side of Rct (e.g., 930) can be connected to the top coil pad (e.g., 904). The formed DDC loop can be positioned between MP (e.g., 1002) and top coil (e.g., 1006) in down track direction and driving magnetic flux in the same direction as the top coil 61.

Figure 11:
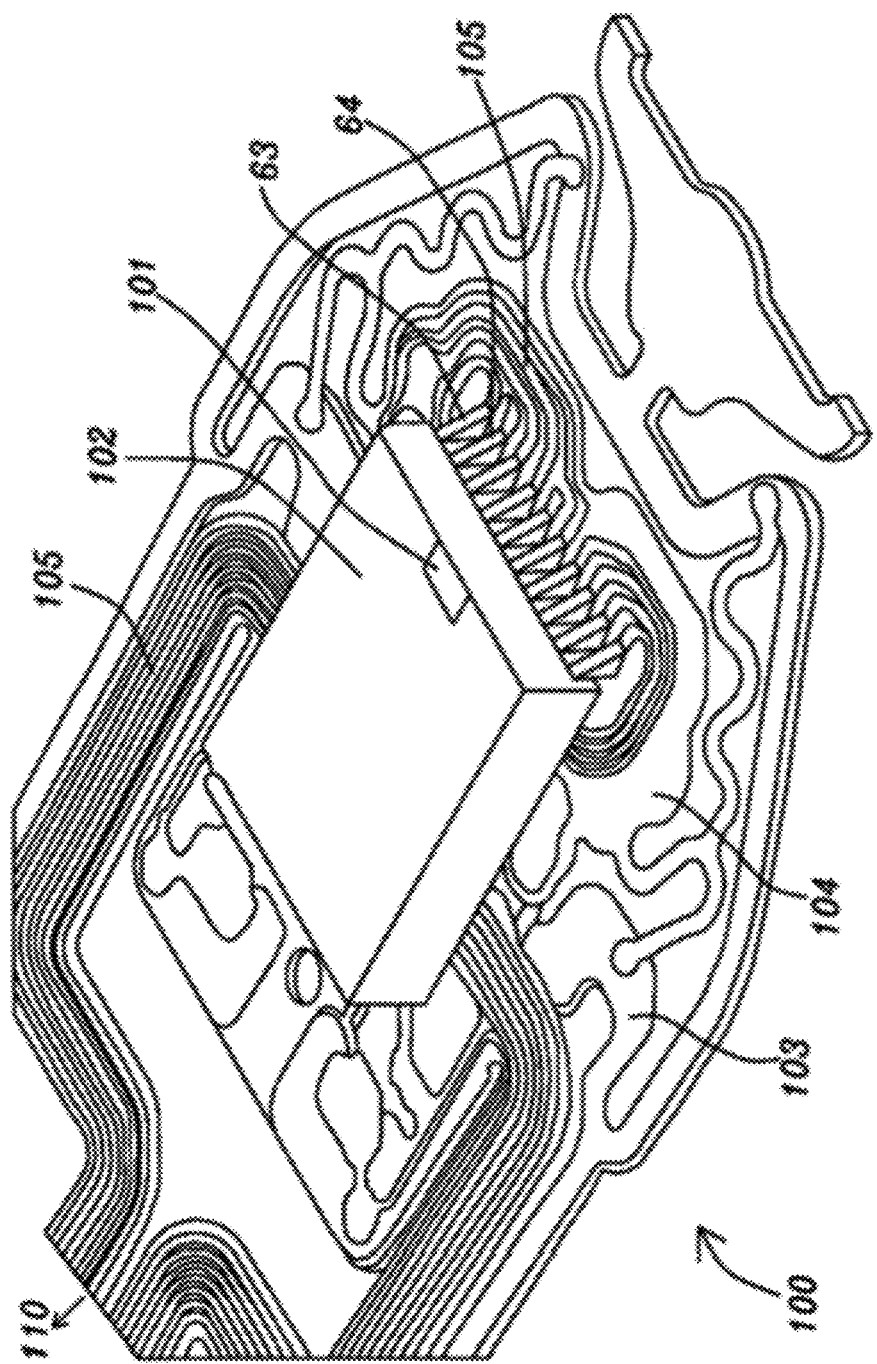
FIG. 11 is an oblique view of a slider on which a combined read/write head structure is mounted, and having adjoining pads and trace lines (wiring) formed on a suspension, according to some embodiments of the present disclosure.
Figure 12:
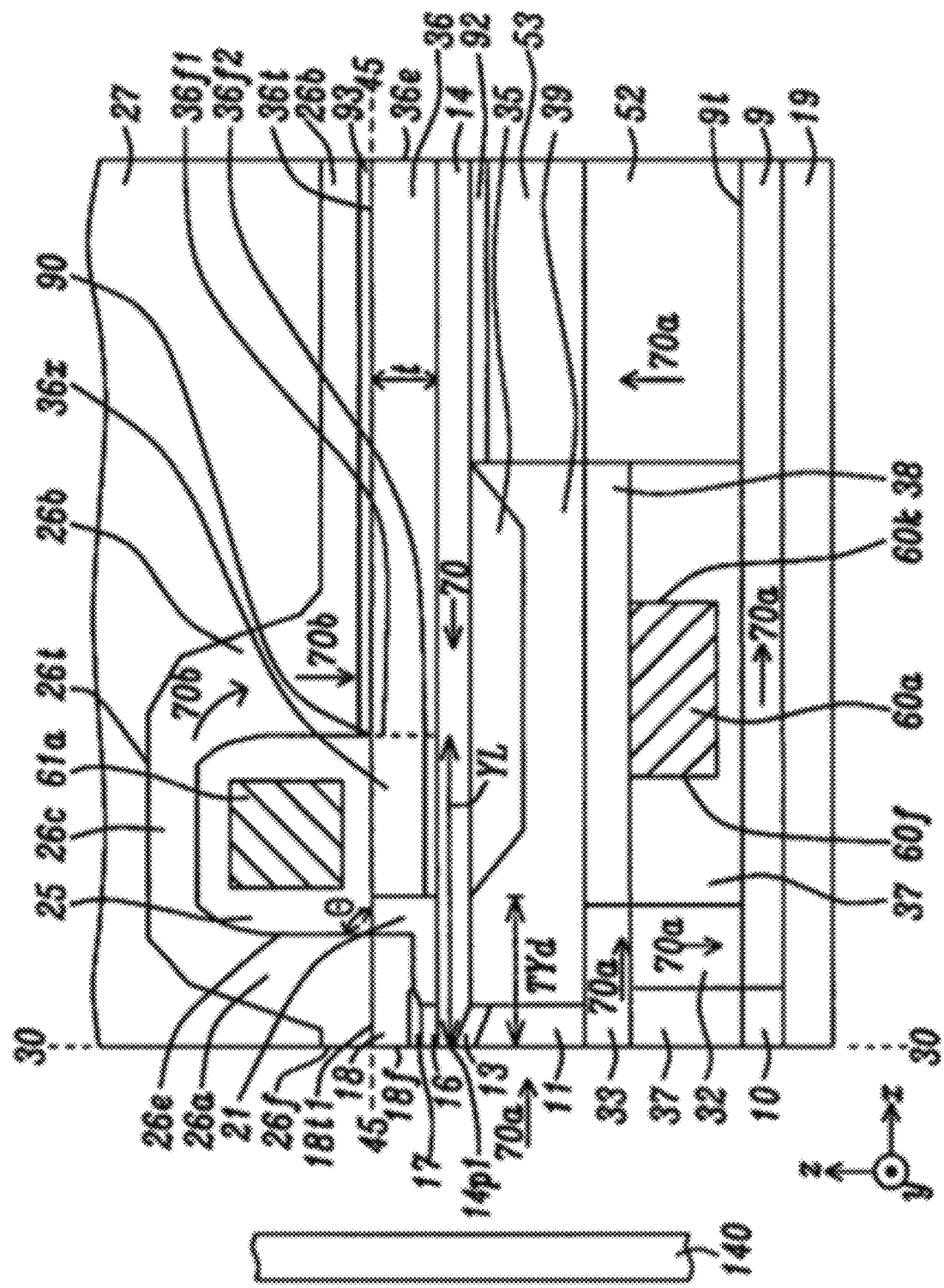
FIG. 12 is a down-track cross-sectional view where the writer in FIG. 6 is modified by adding a first insulation layer (IL) between the BGC and MP, and a second IL between the top yoke (TY) and PP3 shield to electrically isolate the MP back portion, according to some embodiments of the present disclosure.

Referring to FIG. 11, HGA 100 is depicted and features suspension 103, an overlying dielectric layer 104, and slider 102 formed thereon. A combined read/write head 101 comprised of a PMR writer of the present disclosure adjoins a top side of the slider facing away from the suspension. The suspension is supported using an actuator arm that is driven by an actuation motor to sweep the suspension and slider across the surface of a recording disk as described previously with regard to FIG. 1. A plurality of writer pads including DFH pads 63, 64 are employed to control a current to the bucking coil, driving coil, and DFH writer heater while reader pads control current to the reader sensors, and DFH reader heater. Connections between the pads and the PMR writer components are within the slider and not visible from this view. The same fabrication scheme used to build a single writer may be employed to fabricate SDW or STW structures of the present disclosure so that no additional product cost is incurred.

In order to form a current path through the MP tip, one or two insulation layers are added to existing writer structures to give the embodiments illustrated in FIGS. 12-15. According to a first embodiment of the present disclosure depicted in FIG. 12, the uDY rDWS BGC base writer in FIG. 6 is modified by including a first insulation layer 92 behind the tBY 35, and between BGC 53 and a back portion of MP 14 to electrically isolate the MP back portion from the leading loop. Moreover, a second insulation layer 93 is formed behind PP3 TS inner corner 90 and between the top yoke 36 and PP3 TS back portion 26 b to electrically isolate the MP back portion from the trailing loop. Both of the first and second insulation layers have a thickness of 10 nm to 300 nm with a nominal value around 60-100 nm and are made of one or more layers of metal oxide including but not limited to AlOx, SiOx, TaOx, and TiOx, and other metal oxides used in the art.

Figure 13:
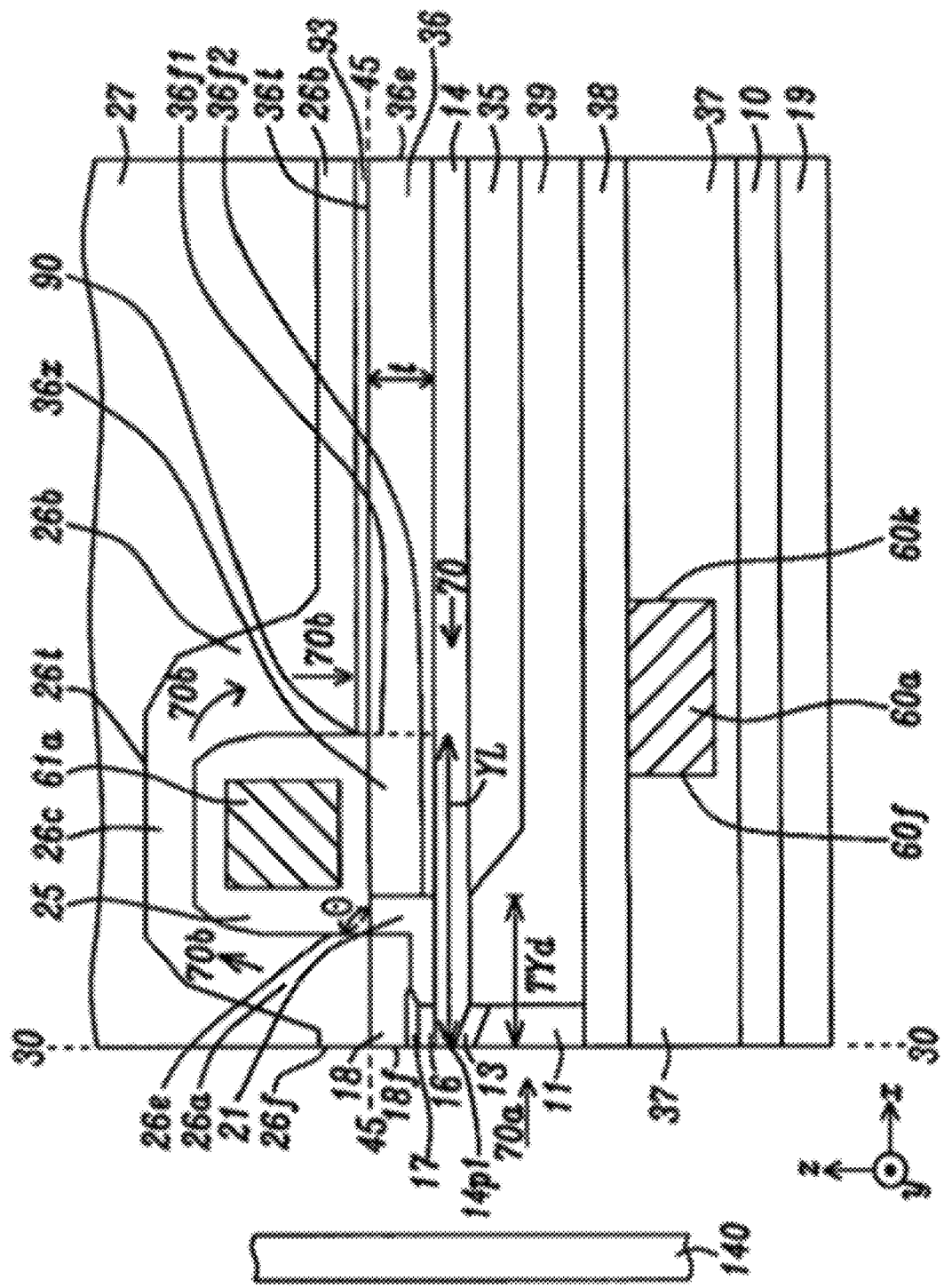
FIG. 13 is a down-track cross-sectional view where the uDY nDWS writer in FIG. 7 is modified by adding an insulation layer between the TY and PP3 shield to electrically isolate the MP back portion from the trailing loop, according to some embodiments of the present disclosure.

A second embodiment of the present disclosure is shown in FIG. 13 and is a modification of the uDY nDWS base writer structure in FIG. 7 where insulation layer 93 described previously is formed on TY 36 at plane 45-45 and behind PP3 TS inner corner 90. Thus, the insulation layer separates the PP3 TS back portion 26 b from the TY and electrically isolates the MP back portion from the trailing loop.

Figure 14:
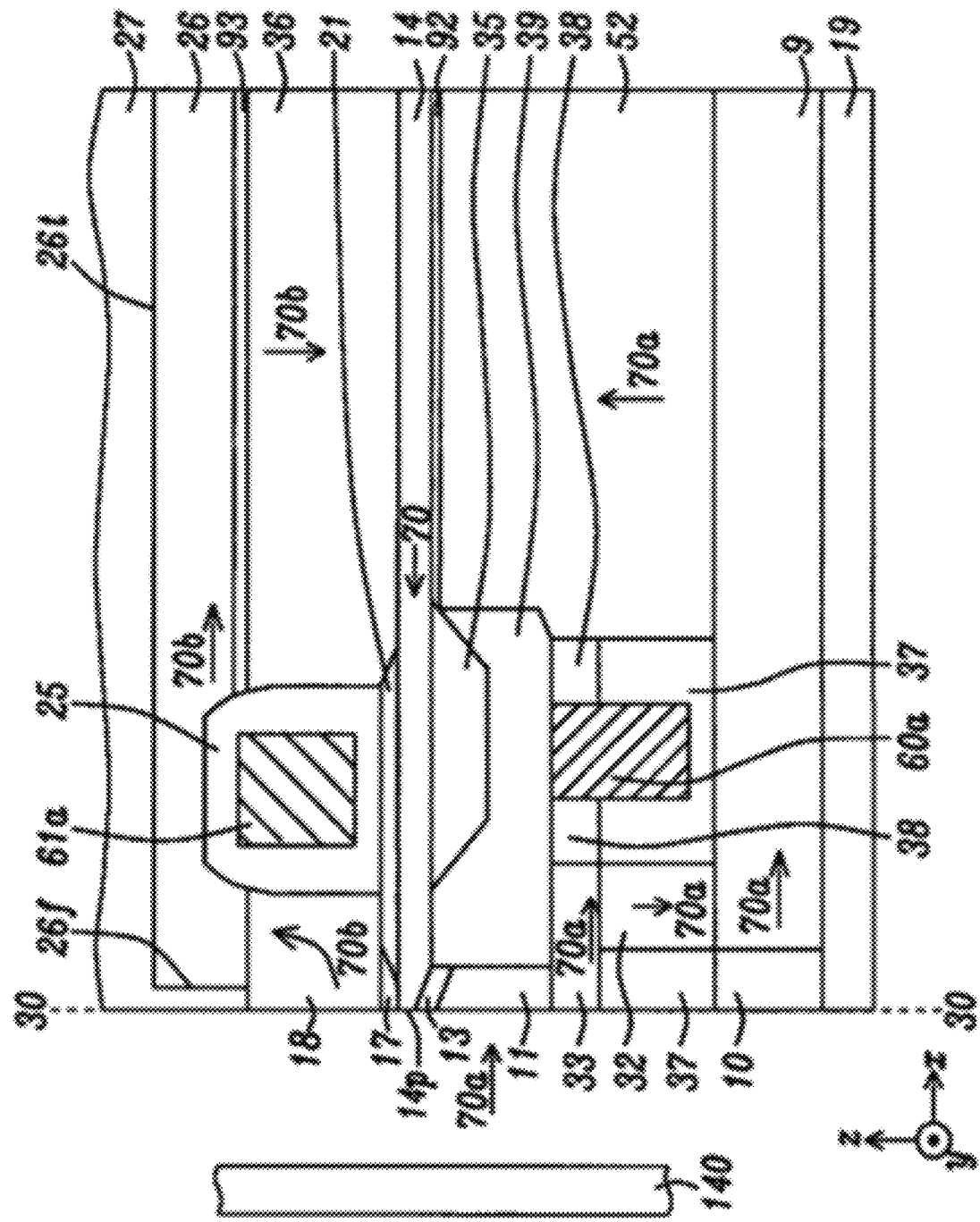
FIG. 14 is a down-track cross-sectional view where the ePL rDWS writer in FIG. 8 is modified by adding a first IL between the BGC and MP, and a second IL between the TY and PP3 shield to electrically isolate the MP back portion from the leading and trailing loops, according to some embodiments of the present disclosure.

According to a third embodiment of the present disclosure depicted in FIG. 14, the ePL rDWS LBG base writer in FIG. 8 is modified to include first insulation layer 92 between LBG 52 and a back portion of MP 14 to electrically isolate the MP back portion from the leading loop. Furthermore, second insulation layer 93 is formed on TY 36 and adjoins a bottom surface of PP3 TS 26 behind driving coil front portion 61 a so that the MP back portion is electrically isolated from the trailing loop. Depending on the thickness of the insulation layers, some magnetic flux 70 a and 70 b in the leading loop and trailing loop, respectively, may leak into the MP.

Figure 15:
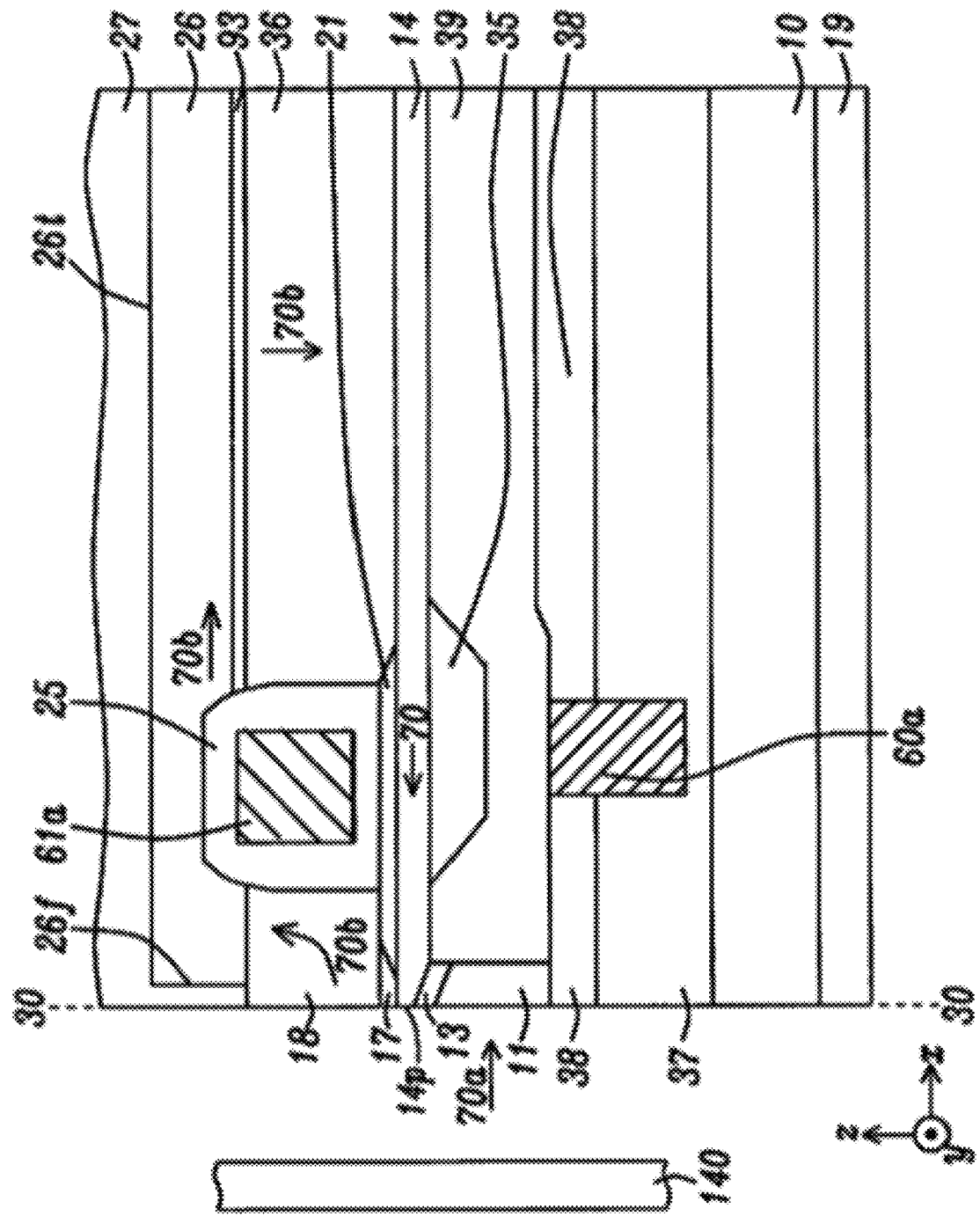
FIG. 15 is a down-track cross-sectional view where the ePL nDWS writer in FIG. 9 is modified by adding an insulation layer between the TY and PP3 shield to isolate the MP back portion from the trailing loop, according to some embodiments of the present disclosure.

Referring to FIG. 15, a fourth embodiment of the present disclosure is shown where the ePL nDWS base writer in FIG. 9 is modified to insert insulation layer 93 on TY 36 and adjoining a bottom surface of PP3 TS 26. As a result, a back portion of MP 14 is electrically isolated from the trailing loop.

FIGS. 16-20 illustrate various embodiments of the present disclosure from an ABS view of the MP tip and surrounding shield structure. It should be understood that each of the embodiments in FIGS. 16-20 may be incorporated in any of the writer schemes described previously with regard to FIGS. 12-15. In particular, R_tip, and therefore MP tip protrusion, is tuned in the various embodiments based on the volume of NM metal contacting the MP tip, and the NM metal composition. R_tip is expected to have the least dependency on MP PWA and MP dimensions when the conducting path width in the WG is narrower than PWA and independent of PWA. As R_tip increases, MP protrusion is enhanced.

Referring to FIG. 16, one embodiment of an electrical connection between MP tip 14 p and the surrounding shield structure is depicted. First NM metal layer 55 is formed in the WG, has thickness t1 of 15 nm to 22 nm, and extends from the ABS to a height of 20 nm to 60 nm. The first NM metal layer preferably has a width no more than PWA+2s where s is the SG width and makes a contact between HS 17 and MP tip 14 p without touching side shield 12 when SG 15 is not a NM metal layer. The first NM metal layer is a single layer or multilayer comprised of one or more of Ru, NiCr, Ta, Cu, W, Ti, or other conductive materials used in the art. Center plane 44-44 bisects the MP trailing side 14 t 1 and MP leading side 14 b 1. MP side 14 s adjoins a side gap 15 on each side of the center plane. Leading gap 13 is between the MP leading side and LS 11. HS layer 17 has a width w that is bisected by the center plane and contacts a top surface of first NM metal layer 55 and a top surface of WG 16 on each side of the first NM metal layer. Note that WG side 16 s is self-aligned to HS layer side 17 s on each side of the center plane. Plane 41-41 comprises the MP trailing side at the ABS, and forms the interface between WG 16 and side shields (SS) 12, and between write shield (WS) 18 and each SS. The WS contacts WG sides 16 s as well as HS layer top surface 17 t and sides 17 s. Thus, the MP tip has an electrical connection to the HS layer while the MP back portion is electrically insulated from the trailing loop.

Figure 17:
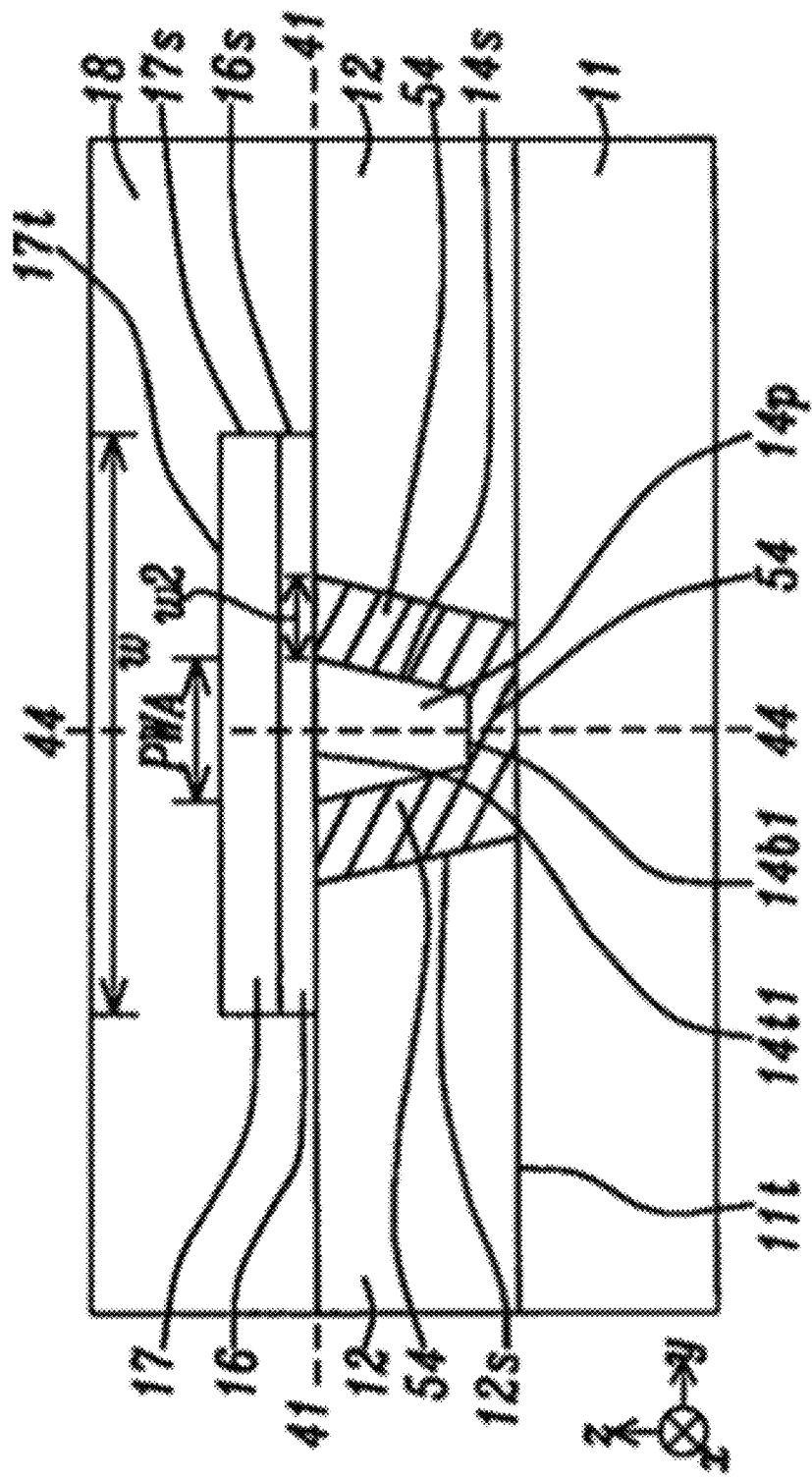

In FIG. 17, a second embodiment of an electrical connection between MP tip 14 p and the surrounding shield structure is illustrated. The first NM metal layer in the WG of the first embodiment is removed so that WG 16 has width w and separates MP trailing side 14 t 1 from HS layer 17. However, a second NM metal layer 54 is formed in the leading gap, and in each side gap between SS inner side 12 s and MP side 14 s so that the MP tip is electrically connected to a top surface 11 t of LS 11, and each SS 12, respectively. The second NM metal layer may be a single layer or multilayer and is comprised of one or more materials mentioned previously with respect to the first NM layer. Second NM metal layer width in the SG is typically from 20 nm to 60 nm. One advantage of the second embodiment is to enhance MP protrusion with less HS layer protrusion to avoid reliability issues from excessive HS layer protrusion (wear).

Figure 18:
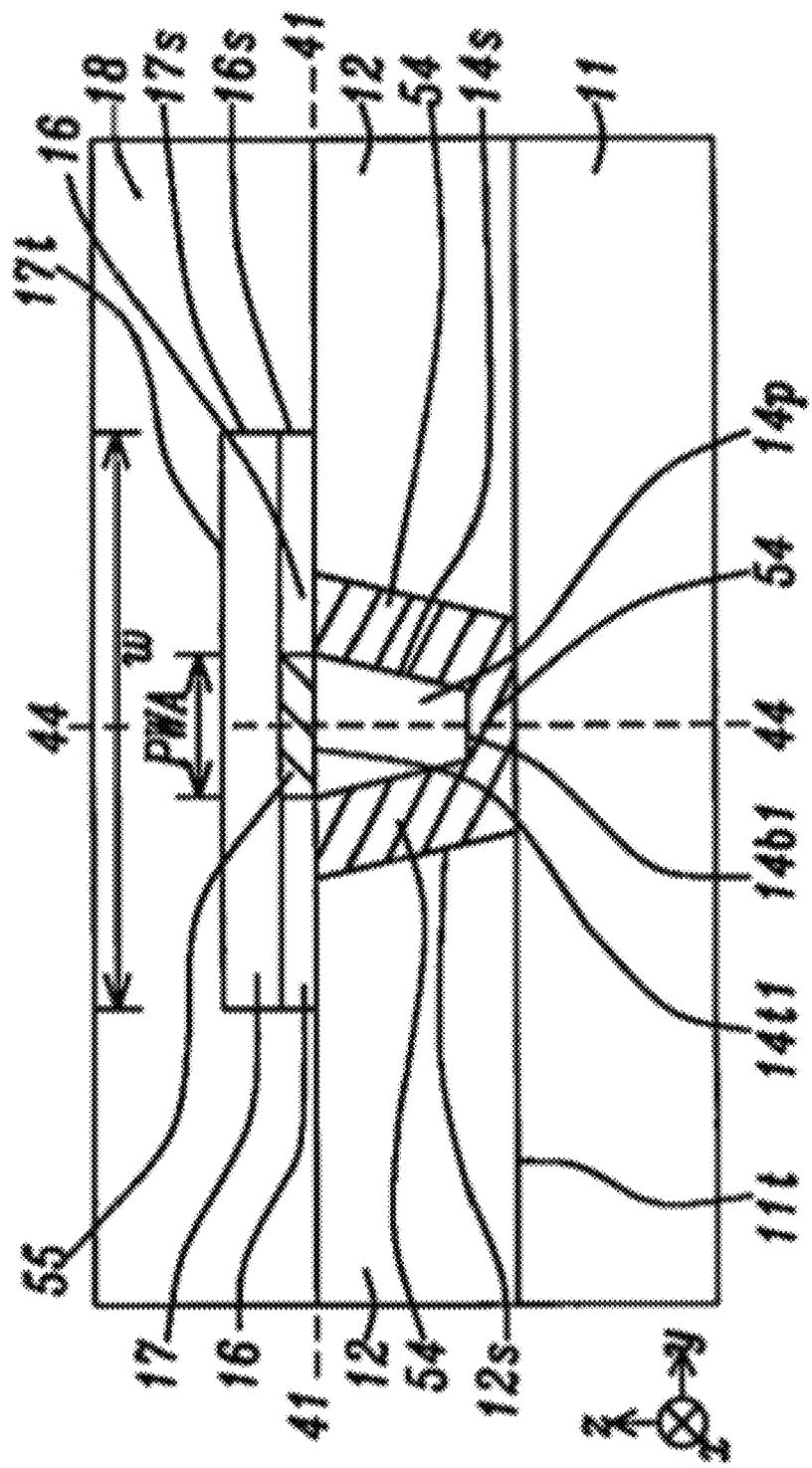

According to a third embodiment of an electrical connection between MP tip 14 p and the surrounding shield structure shown in FIG. 18, the first embodiment where first NM metal layer 55 is formed in the WG between MP trailing side 14 t 1 and HS layer 17 is modified to include the second NM metal layer 54 in the side gaps and leading gap as described previously in the second embodiment.

Figure 19:
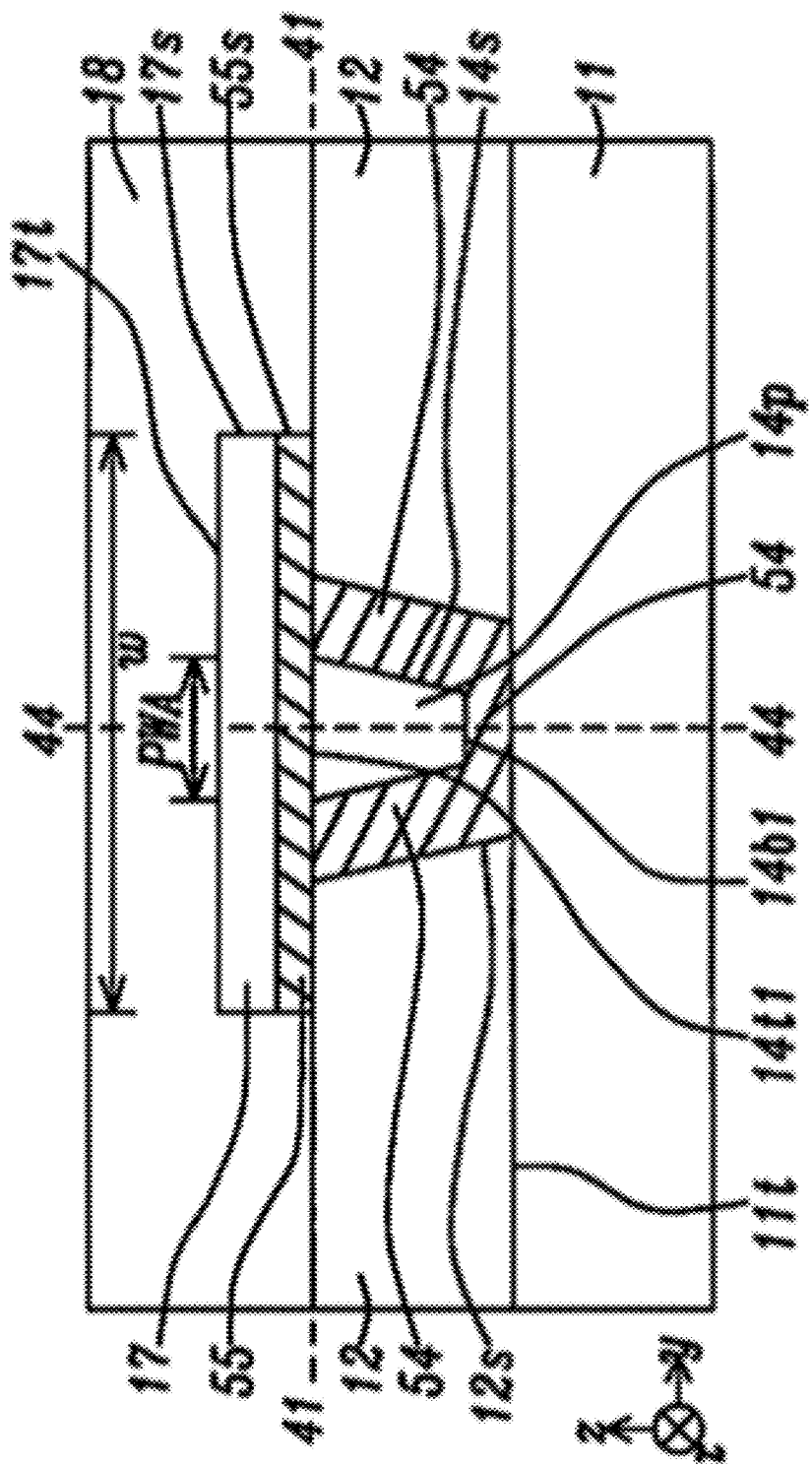

Referring to FIG. 19, a fourth embodiment of an electrical connection between MP tip 14 p and the surrounding shields is shown where the third embodiment is modified to widen the first NM metal layer 55 to have width w so that first NM metal layer side 55 s on each side of center plane 44-44 is self-aligned (coplanar) with HS layer side 17 s.

Figure 20:
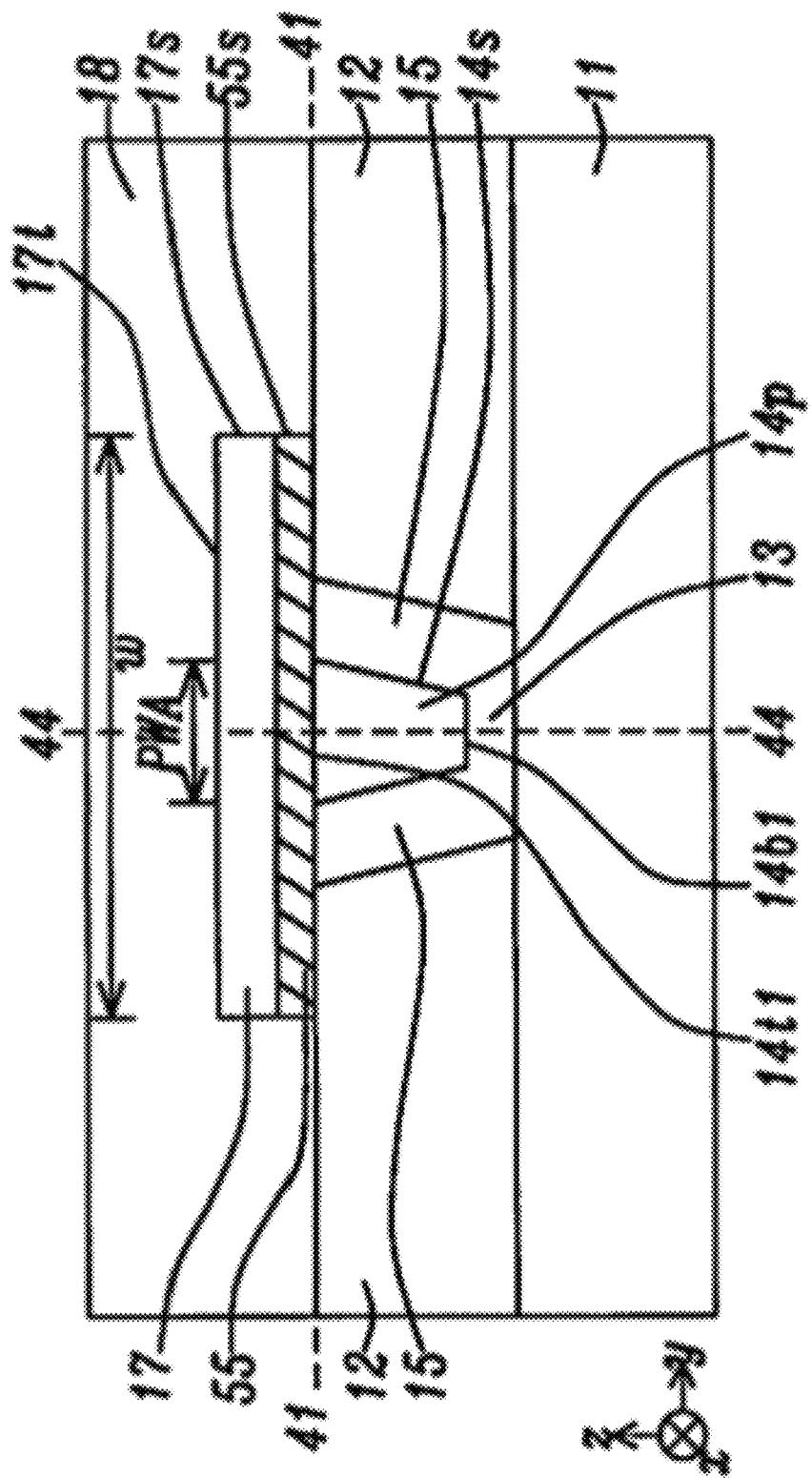

A fifth embodiment of the present disclosure that relates to an electrical connection between MP tip 14 p and surrounding shields is depicted in FIG. 20. In particular, the first embodiment in FIG. 16 is modified to widen the first NM metal layer 55 to have width w so that first NM metal layer side 55 s on each side of center plane 44-44 is coplanar with HS layer side 17 s. R_tip for the third embodiment in FIG. 18 is expected to be lower than that of the first two embodiments while R_tip for the fourth embodiment is expected to be the lowest of all assuming the composition for NM metal layers 54, 55, and the width and height of the NM metal layers are constant in each embodiment.

Figure 21:
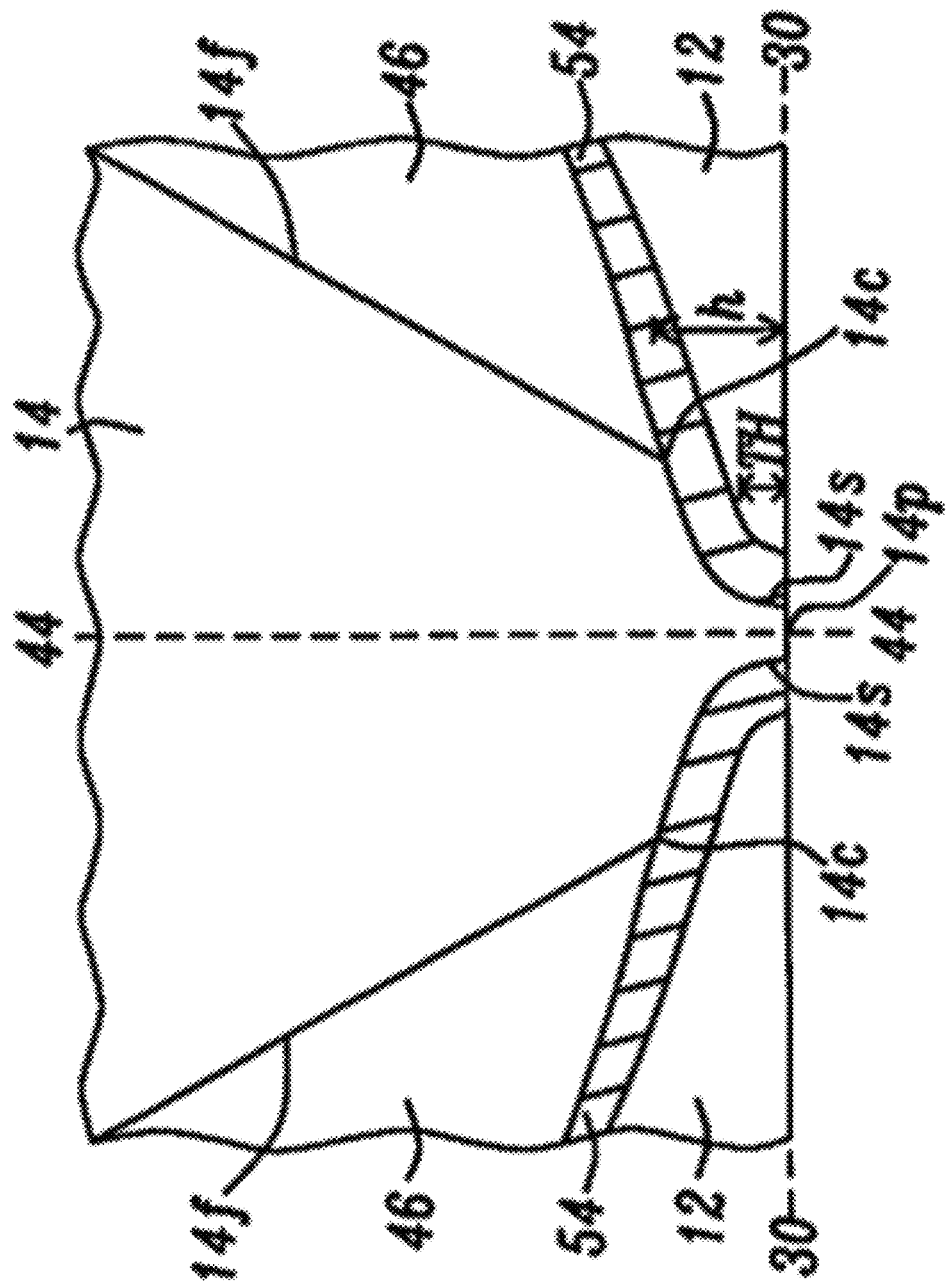
FIG. 21 is a top-down view where a NM metal layer is formed in each side gap between the MP and a side shield (SS) and extends from the ABS to a far side of each SS, according to some embodiments of the present disclosure.

FIG. 21 illustrates a top-down view of any of the second through fourth embodiments (FIGS. 17-19) where all PMR writer layers above MP 14 and side shields 12 are removed to clearly reveal second NM metal layer 54 on each side of center plane 44-44. The second NM metal layer adjoins each MP tip side 14 s from the ABS 30-30 to a throat height (TH) of about 50 nm to 120 nm, has a width of 20 nm to 60 nm, and then slopes away from the center plane with increasing separation from the center plane as the second NM metal layer height from the ABS increases. Each MP tip side connects with curved MP side 14 c, which in turn connects with MP flared side 14 fat height h from the ABS. Insulation layer 46 separates each MP flared side from the second NM metal layer.

Figure 22:
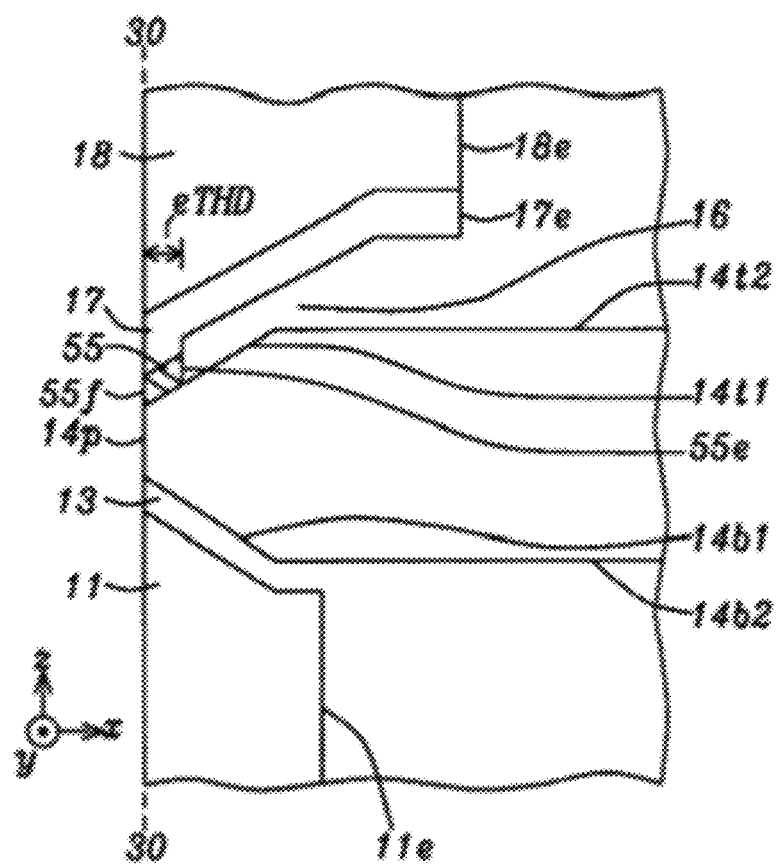
FIGS. 22-23 are down-track cross-sectional views where a NM metal layer in the WG is at the ABS and recessed from the ABS, respectively, according to embodiments of the present disclosure.

Referring to FIG. 22, a down-track cross-sectional view at center plane 44-44 is shown for any of the first embodiment (FIG. 16) and third through fifth embodiments (FIGS. 18-20) where first NM metal layer 55 is formed in the WG between MP trailing side 14 t 1 and HS layer 17. According to one embodiment, the first NM metal layer has a front side 55 f at the ABS 30-30 and extends to a backside 55 e at a height of 20 nm to 60 nm and proximate to HS layer tip height eTHd. LS 11 has backside 11 e while HS layer and WS 18 have backsides 17 e and 18 e, respectively, that are typically substantially greater than eTHd. Note that eTHd is relatively small compared with other device dimensions mentioned earlier such as width w, and heights TYd and YL, and is therefore sensitive to lapping control, which means that R_tip may have substantial device to device variation.

Figure 23:
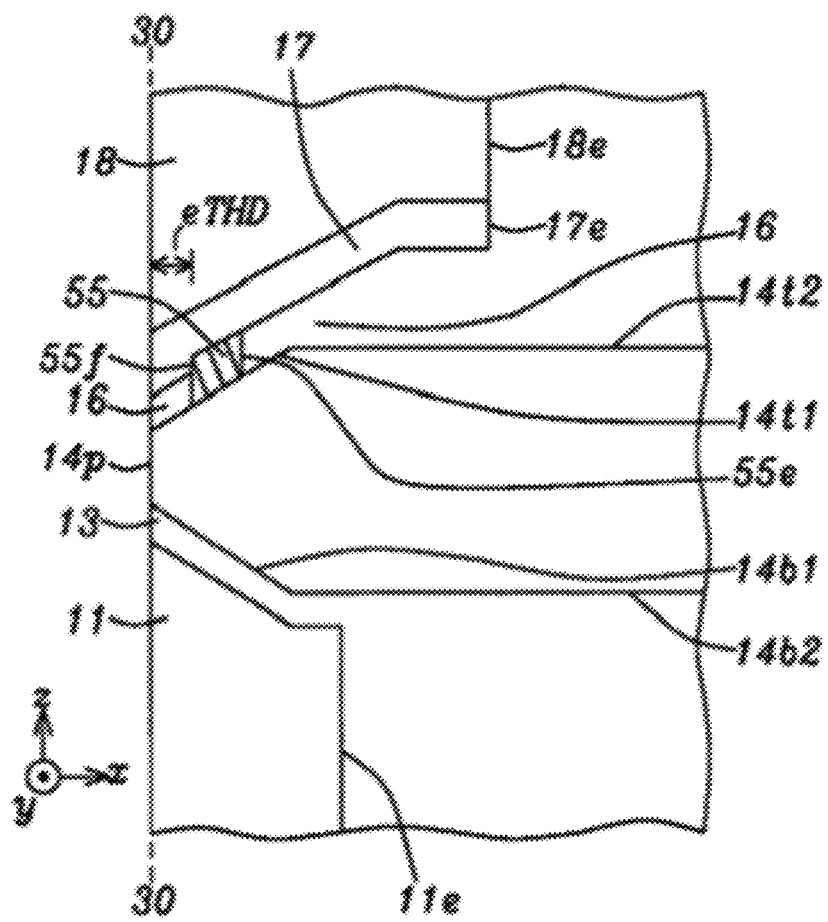

As depicted in FIG. 23, the present disclosure also anticipates that first NM layer 55 may be in the WG but front side 55 f is recessed 50 nm to 100 nm from the ABS 30-30. In this embodiment, there is more reproducibility in providing the desired first NM metal layer width and height (volume) and a desired R_tip resistance value than when front side is exposed at the ABS and is subject to variations in the lapping process.

Table 1 shows simulation results of PMR writer heads with DDC designs in FIG. 10 (b)-(f) according to an embodiment of the present disclosure where the writer has an ABS view according to the first embodiment in FIG. 16-20, and a down-track cross-sectional view as shown in FIG. 22 where the first NM metal layer 55 is at the ABS 30-30. Table 1 shows two sets of examples with Iw0-pk fixed at 120 mA, R top coil at ~1 ohm and R_lead at ~2 ohm. When R_tip is ~8 ohm, Case (1a), (1b), and (1c) show the corresponding Rc (Rc=Rcb+Rct) needs to be set to if the maximum current flows in the DDC loop is at 3, 5, 10 mA respectively. When R_tip is ~3 ohm, Case (2a), (2b), and (2c) show the corresponding Rc (Rc=Rcb+Rct) needs to be set to if the maximum current flows in the DDC loop is at 3, 5, 10 mA respectively.

TABLE 1

| | | | | | | | | | |
|---|---|---|---|---|---|---|---|---|---|
| | | | Iw_0-pk = 120 mA | | | | | | |
| R_top coil | 1.0 | Ohm | V_top coil | 117.000 | Volt | I_top coil | 117.0 | mA | Case (1a) |
| R_tip | 8.0 | Ohm | V_tip | 24.000 | Volt | I_tip | 3.0 | mA | |
| R_lead | 2.0 | Ohm | V_lead | 6.000 | Volt | I_lead | 3.0 | mA | |
| Rc | 29.0 | Ohm | Vs | 87.000 | Volt | Ic | 3.0 | mA | |
| R_total | 1.0 | Ohm | V_total | 117.000 | Volt | I_total | 120.0 | mA | |
| | | | Iw_0-pk = 120 mA | | | | | | |
| R_top coil | 1.0 | Ohm | V_top coil | 115.000 | Volt | I_top coil | 115.0 | mA | Case (1b) |
| R_tip | 8.0 | Ohm | V_tip | 40.000 | Volt | I_tip | 5.0 | mA | |
| R_lead | 2.0 | Ohm | V_lead | 10.000 | Volt | I_lead | 5.0 | mA | |
| Rc | 13.0 | Ohm | Vs | 65.000 | Volt | Ic | 5.0 | mA | |
| R_total | 1.0 | Ohm | V_total | 115.000 | Volt | I_total | 120.0 | mA | |
| | | | Iw_0-pk = 120 mA | | | | | | |

TABLE 1-continued

| | | | | | | | | | |
|---|---|---|---|---|---|---|---|---|---|
| R_top coil | 1.0 | Ohm | V_top coil | 110.000 | Volt | I_top coil | 110.0 | mA | Case (1c) |
| R_tip | 8.0 | Ohm | V_tip | 80.000 | Volt | I_tip | 10.0 | mA | |
| R_lead | 2.0 | Ohm | V_lead | 20.000 | Volt | I_lead | 10.0 | mA | |
| Rc | 1.0 | Ohm | Vs | 10.000 | Volt | Ic | 10.0 | mA | |
| R_total | 0.9 | Ohm | V_total | 110.000 | Volt | I_total | 120.0 | mA | |
| | | | Iw_0-pk = 120 mA | | | | | | |
| R_top coil | 1.0 | Ohm | V_top coil | 117.000 | Volt | I_top coil | 117.0 | mA | Case (2a) |
| R_tip | 3.0 | Ohm | V_tip | 9.000 | Volt | I_tip | 3.0 | mA | |
| R_lead | 2.0 | Ohm | V_lead | 6.000 | Volt | I_lead | 3.0 | mA | |
| Rc | 34.0 | Ohm | Vs | 102.000 | Volt | Ic | 3.0 | mA | |
| R_total | 1.0 | Ohm | V_total | 117.000 | Volt | I_total | 120.0 | mA | |
| | | | Iw_0-pk = 120 mA | | | | | | |
| R_top coil | 1.0 | Ohm | V_top coil | 115.000 | Volt | I_top coil | 115.0 | mA | Case (2b) |
| R_tip | 3.0 | Ohm | V_tip | 15.000 | Volt | I_tip | 5.0 | mA | |
| R_lead | 2.0 | Ohm | V_lead | 10.000 | Volt | I_lead | 5.0 | mA | |
| Rc | 18.0 | Ohm | Vs | 90.000 | Volt | Ic | 5.0 | mA | |
| R_total | 1.0 | Ohm | V_total | 115.000 | Volt | I_total | 120.0 | mA | |
| | | | Iw_0-pk = 120 mA | | | | | | |
| R_top coil | 1.0 | Ohm | V_top coil | 110.000 | Volt | I_top coil | 110.0 | mA | Case (2c) |
| R_tip | 3.0 | Ohm | V_tip | 30.000 | Volt | I_tip | 10.0 | mA | |
| R_lead | 2.0 | Ohm | V_lead | 20.000 | Volt | I_lead | 10.0 | mA | |
| Rc | 6.0 | Ohm | Vs | 60.000 | Volt | Ic | 10.0 | mA | |
| R_total | 0.9 | Ohm | V_total | 110.000 | Volt | I_total | 120.0 | mA | |

FIG. 16 with narrow WG connection tends to have the highest R_tip at about 12-15 ohm. FIGS. 17-19 have SG connection and tend to have low R_tip at about 2-4 ohm. FIG. 20 tends to have R_tip at about 6-10 ohm depending on the WG material design. Because the current bias follows write current with overshoot, the effective gain follows I_tip maximum and the reliability can follow RMS of the write current. A PMR writer having the DDC design demonstrates more assisting effect in term of writer write-ability and high frequency response than a conventional PMR writer at the same reliability limit.

In a first example embodiment, a perpendicular magnetic recording (PMR) writer is described. The PMR writer can include a main pole (e.g., MP 14 in FIG. 6A) including a tip portion disposed adjacent to an air bearing surface (ABS). The PMR writer can further include a driving coil (e.g., top coil 61) electrically connected to the main pole. The driving coil can form a primary electrical current path with a bucking coil for passing a writing current, where the main pole is driven to generate a magnetic flux that passes through the MP tip and is used to write one or more magnetic bits in a magnetic medium (e.g., a magnetic disk).

The PMR writer can further include a write shield electrically connected to the tip portion of the main pole and at least two contact vias with under paths configured to generate a parallel path to the driving coil. The main pole and the write shield can be electrically connected through one or two series resistors, forming a second writing current path to generate a magnetic flux that passes through the tip portion of the main pole and bias the tip portion electrically with the writing current to improve quality of the main pole.

In some instances, the PMR writer can further include a trailing loop for the magnetic flux return to the main pole. The training loop can include a hot seed (HS) layer, the write shield (WS) on the HS layer, an uppermost (PP3) trailing shield (TS), and a top yoke (TY) on a MP back portion. The PMR writer can further include a first insulation layer formed between the TY and PP3 TS to electrically isolate the MP back portion from the trailing loop.

The PMR writer can further include a leading loop for magnetic flux return to the MP back portion that comprises the LS at the ABS. The PMR writer can also include a second insulation layer is formed on a lower back gap (LBG) or back gap connection (BGC) in the leading loop to electrically isolate the leading loop from the MP back portion.

In some instances, each of the first insulation layer and the second insulation layer has a thickness of between 10 nm and 300 nm.

In some instances, any of the first insulation layer and the second insulation layer comprises a single layer or multiple layers comprising one or more of AlOx, SiOx, TaOx, and TiOx.

In some instances, the PMR writer can include a first non-magnetic (NM) metal layer formed in a write gap (WG) on a MP trailing side and a second NM metal layer in a side gap (SG) that adjoins each MP side.

In another example embodiment, a write head is provided. The write head can include (a) a main pole layer (MP) having a MP tip formed between a hot seed (HS) layer in a trailing shield structure. The write head can also include a leading shield (LS) at an air bearing surface (ABS). The LS can be configured so that a write current passing through a driving coil and a bucking coil generates a magnetic flux that passes through the MP tip and is used to write one or more magnetic bits in a magnetic medium.

The write head can also include (b) a trailing loop for the magnetic flux return to the MP that comprises the HS layer, a write shield (WS) on the HS layer, an uppermost (PP3) trailing shield (TS), and a top yoke (TY) on a MP back portion. The write head can also include (c) one or both of a first non-magnetic (NM) metal layer formed in a write gap (WG) on a MP trailing side, and a second NM metal layer in a side gap (SG) that adjoins each MP side to establish an electrical connection between the MP tip and one or both of the HS layer and side shields (SS), respectively. The write head can also include (d) a first insulation layer formed between the TY and PP3 TS to electrically isolate the MP back portion from the trailing loop. The MP and the WS can be electrically connected to the driving coil or two writer pads through—one or two built-in series resistor (Rct and/or Rcb) to form a second electric current path in parallel with the driving coil through the MP tip.

In some instances, the write head can further include a leading loop for magnetic flux return to the MP back portion that comprises the LS at the ABS and wherein a second insulation layer is formed on a lower back gap (LBG) or back gap connection (BGC) in the leading loop to electrically isolate the leading loop from the MP back portion.

In some instances, each of the first insulation layer and the second insulation layer has a thickness of about 10 nm to 300 nm.

In some instances, each of the first insulation layer and the second insulation layer is a single layer or multilayer comprised of one or more of AlOx, SiOx, TaOx, and TiOx.

In some instances, each of the first and second NM metal layers is comprised of one or more of Ru, NiCr, Ta, Cu, W, or Ti.

In some instances, a portion of the second NM metal layer that adjoins each MP side extends from the ABS to a height of 50 nm to 120 nm and has a cross-track width of 20 nm to 60 nm.

In some instances, the portion of the first NM metal layer that adjoins the MP tip extends from the ABS to a height of 20 nm to 60 nm and has a down-track thickness from 15 nm to 22 nm.

In some instances, the first NM metal layer has a front side that is recessed to a height of 50 nm to 100 nm from the ABS.

In some instances, the first NM metal layer has a width that is less than a sum (PWA+2s) where PWA is a track width of the MP trailing side and s is a width of each side gap so that the first NM metal layer does not contact a side shield.

In some instances, the first NM metal layer has a width that is essentially equal to that of the HS layer.

In some instances, the write head can include a TY extension that is formed below a front portion of the driving coil, and with a backside that adjoins a front side of the TY.

In some instances, writer shield is isolated from DFH ground (connected to preamp ground in HDD) either by fully open or a resistor (R_protect) with resistance ~20k ohm or more.

In another example embodiment, a head gimbal assembly (HGA) is provided. The HGA can include (a) a PMR writer as described herein and (b) a suspension that elastically supports the PMR writer. The suspension can include a flexure to which the PMR writer is joined, a load beam with one end connected to the flexure, and a base plate connected to the other end of the load beam.

In another example embodiment, a magnetic recording apparatus is provided. The magnetic recording apparatus can include (a) a PMR writer as described herein, (b) a magnetic recording medium positioned opposite to a slider on which the PMR writer structure is formed, (c) a spindle motor that rotates and drives the magnetic recording medium, and (d) a device that supports the slider, and that positions the slider relative to the magnetic recording medium.

In another example embodiment, a PMR writer is provided. The PMR writer can include a main pole a tip portion disposed adjacent to an air bearing surface (ABS). The PMR writer can also include a driving coil electrically connected to the main pole. The driving coil can form a first electrical path with the main pole to pass a write current to the main pole. The main pole can be configured to generate a magnetic flux that passes through the tip portion and is used to write one or more magnetic bits in a magnetic medium.

Th PMR writer can also include a write shield electrically connected to the tip portion of the main pole and at least two contact pads configured to generate a second electric current. The main pole and the write shield can be electrically connected to the at least two contact pads through at least a first series resistor, forming a second electric current path between the main pole, write shield, and at least the first series resistor.

In some instances, the PMR writer can include a trailing loop for a return of the magnetic flux to the main pole. The trailing loop can include a hot seed (HS) layer, the write shield (WS) on the HS layer, an uppermost (PP3) trailing shield (TS), and a top yoke (TY) on a main pole back portion. The PMR writer can also include a first insulation layer formed between the TY and PP3 TS to electrically isolate the main pole back portion from the trailing loop.

In some instances, the PMR writer can include a leading loop for magnetic flux return to the main pole back portion that comprises a leading shield (LS) at the ABS, and a second insulation layer is formed on a lower back gap (LBG) or back gap connection (BGC) in the leading loop to electrically isolate the leading loop from the main pole back portion.

In some instances, the PMR writer can include a first non-magnetic (NM) metal layer formed in a write gap (WG) on a main pole trailing side, and a second NM metal layer in a side gap (SG) that adjoins each main pole side. A portion of the second NM metal layer that adjoins each main pole side can extend from the ABS to a height of 50 nm to 120 nm, and can have a cross-track width of 20 nm to 60 nm.

In some instances, the portion of the first NM metal layer that adjoins the tip portion extends from the ABS to a height of 20 nm to 60 nm, and has a down-track thickness from 15 nm to 22 nm. In some instances, the first NM metal layer has a front side that is recessed to a height of 50 nm to 100 nm from the ABS. In some instances, the first NM metal layer has a width that is less than a sum (PWA+2s) where PWA is a track width of the main pole trailing side and has a width of each side gap such that the first NM metal layer does not contact a side shield. In some instances, the first NM metal layer has a width that is essentially equal to that of the HS layer.

In some instances, the PMR writer can include a TY extension that is formed below a front portion of the driving coil, and with a backside that adjoins a front side of the TY. In some instances, the writer shield is isolated from a second contact pad comprising a ground by a protect resistor with a resistance of around 20 thousand ohms.

In another example embodiment, a system is provided. The system can include a main pole a tip portion disposed adjacent to an air bearing surface (ABS). The system can also include a driving coil forming a primary electrical current path with a bucking coil for passing a writing current. The main pole can be configured to be driven to generate a magnetic flux that passes through the tip portion and is used to write one or more magnetic bits in a magnetic medium.

The system can also include a write shield electrically connected to the tip portion of the main pole and a trailing loop for a return of the magnetic flux to the main pole. The trailing loop can include a hot seed (HS) layer, the write shield (WS) on the HS layer, an uppermost (PP3) trailing shield (TS), and a top yoke (TY) on a main pole back portion. The system can also include a first insulation layer formed between the TY and PP3 TS to electrically isolate the main pole back portion from the trailing loop. The system can also include at least two writer pads that are in contact with the driving coil and bucking coil and configured to generate a second electric current path. The main pole and the write shield can be electrically connected to the at least two writer pads through two series resistors, forming the second electric current path with the writing current pass through the main pole, write shield, and the two series resistors.

Various modifications and additions can be made to the exemplary embodiments discussed without departing from the scope of the present embodiments. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

What is claimed is:

1. A perpendicular magnetic recording (PMR) writer comprising:
   a main pole including a tip portion disposed adjacent to an air bearing surface (ABS);
   a driving coil electrically connected to the main pole, the driving coil forming a primary electric current path with a bucking coil for passing a writing current, wherein the main pole is driven to generate the magnetic flux that passes through the tip portion and is used to write one or more magnetic bits in a magnetic medium;
   a write shield electrically connected to the tip portion of the main pole; and
   at least two contact vias with under paths configured to generate a parallel path to the driving coil, wherein the main pole and the write shield are electrically connected through one or two series resistors, forming a second writing current path to generate a magnetic flux that passes through the tip portion of the main pole and bias the tip portion electrically with the writing current to improve writing quality of the main pole.

2. The PMR writer of claim 1, further comprising:
   a trailing loop for a return of the magnetic flux to the main pole, the trailing loop comprising a hot seed (HS) layer, the write shield (WS) on the HS layer, an uppermost (PP3) trailing shield (TS), and a top yoke (TY) on a main pole back portion; and
   a first insulation layer formed between the TY and PP3 TS to electrically isolate the main pole back portion from the trailing loop.

3. The PMR writer of claim 2, further comprising:
   a leading loop for magnetic flux return to the main pole back portion that comprises a leading shield (LS) at the ABS; and
   a second insulation layer is formed on a lower back gap (LBG) or back gap connection (BGC) in the leading loop to electrically isolate the leading loop from the main pole back portion.

4. The PMR writer of claim 3, wherein each of the first insulation layer and the second insulation layer has a thickness of between 10 nm and 300 nm.

5. The PMR writer of claim 3, wherein any of the first insulation layer and the second insulation layer comprises a single layer or multiple layers comprising one or more of AlOx, SiOx, TaOx, and TiOx.

6. The PMR writer of claim 2, further comprising:
   a first non-magnetic (NM) metal layer formed in a write gap (WG) on a main pole trailing side; and
   a second NM metal layer in a side gap (SG) that adjoins each main pole side.

7. The PMR writer of claim 6, wherein a portion of the second NM metal layer that adjoins each main pole side extends from the ABS to a height of 50 nm to 120 nm, and has a cross-track width of 20 nm to 60 nm.

8. The PMR writer of claim 6, wherein the portion of the first NM metal layer that adjoins the tip portion extends from the ABS to a height of 20 nm to 60 nm, and has a down-track thickness from 15 nm to 22 nm.

9. The PMR writer of claim 6, wherein the first NM metal layer has a front side that is recessed to a height of 50 nm to 100 nm from the ABS.

10. The PMR writer of claim 6, wherein the first NM metal layer has a width that is less than a sum (PWA+2s) where PWA is a track width of the main pole trailing side and s is a width of each side gap such that the first NM metal layer does not contact a side shield.

11. The PMR writer of claim 6, wherein the first NM metal layer has a width that is essentially equal to that of the HS layer.

12. The PMR writer of claim 1, further comprising:
    a TY extension that is formed below a front portion of the driving coil, and with a backside that adjoins a front side of the TY.

13. The PMR writer of claim 1, wherein the write shield is isolated from a writer heater ground that is connected to a preamp ground by a protect resistor with a resistance of at least 20 thousand ohms.

14. A write head comprising:
    (a) a main pole layer (MP) having a MP tip formed between a hot seed (HS) layer in a trailing shield structure, and a leading shield (LS) at an air bearing surface (ABS), and configured so that a write current passing through a driving coil and a bucking coil generates a magnetic flux that passes through the MP tip and is used to write one or more magnetic bits in a magnetic medium;
    (b) a trailing loop for a return of the magnetic flux to the MP that comprises the HS layer, a write shield (WS) on the HS layer, an uppermost (PP3) trailing shield (TS), and a top yoke (TY) on a MP back portion;
    (c) one or both of a first non-magnetic (NM) metal layer formed in a write gap (WG) on a MP trailing side, and a second NM metal layer in a side gap (SG) that adjoins each MP side to establish an electrical connection between the MP tip and one or both of the HS layer and side shields (SS), respectively; and
    (d) a first insulation layer formed between the TY and PP3 TS to electrically isolate the MP back portion from the trailing loop,
    wherein the MP and the WS are electrically connected to the driving coil and one or two built-in series resistors to form a second electric current path in parallel with the driving coil through the MP tip.

15. The write head of claim 14, further comprising a leading loop for magnetic flux return to the MP back portion that comprises the LS at the ABS and wherein a second insulation layer is formed on a lower back gap (LBG) or back gap connection (BGC) in the leading loop to electrically isolate the leading loop from the MP back portion.

16. The write head of claim 14, further comprising a TY extension that is formed below a front portion of the driving coil, and with a backside that adjoins a front side of the TY.

17. A system comprising:
    a main pole including a tip portion disposed adjacent to an air bearing surface (ABS);
    a driving coil forming a primary electric current path with a bucking coil for passing a writing current, wherein the main pole is driven to generate a magnetic flux that passes through the tip portion and is used to write one or more magnetic bits in a magnetic medium;

a write shield electrically connected to the tip portion of the main pole;

a trailing loop for a return of the magnetic flux to the main pole, the trailing loop comprising a hot seed (HS) layer, the write shield (WS) on the HS layer, an uppermost (PP3) trailing shield (TS), and a top yoke (TY) on a main pole back portion;

a first insulation layer formed between the TY and PP3 TS to electrically isolate the main pole back portion from the trailing loop; and at least two writer pads that are in contact with the driving coil and bucking coil and configured to generate a second electric current path, wherein the main pole and the write shield are electrically connected to the at least two writer pads through two series resistors, forming the second electric current path with the writing current passing through the main pole, write shield, and the two series resistors.

18. The system of claim 17, further comprising:

a first non-magnetic (NM) metal layer formed in a write gap (WG) on a main pole trailing side; and a second NM metal layer in a side gap (SG) that adjoins each main pole side.

19. The system of claim 18, wherein a portion of the second NM metal layer that adjoins each main pole side extends from the ABS to a height of 50 nm to 120 nm, and has a cross-track width of 20 nm to 60 nm.

20. The system of claim 18, wherein a portion of the first NM metal layer that adjoins the tip portion extends from the ABS to a height of 20 nm to 60 nm, and has a down-track thickness from 15 nm to 22 nm.

* * * * *